(12) United States Patent
Kirby et al.

(10) Patent No.: US 9,111,138 B2
(45) Date of Patent: Aug. 18, 2015

(54) SYSTEM AND METHOD FOR GESTURE INTERFACE CONTROL

(75) Inventors: Shaun K. Kirby, Pasadena, CA (US); David K. Evans, Los Altos Hills, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 82 days.

(21) Appl. No.: 12/957,116

(22) Filed: Nov. 30, 2010

(65) Prior Publication Data

US 2012/0133580 A1     May 31, 2012

(51) Int. Cl.
*G06F 3/01* (2006.01)
*G06K 9/00* (2006.01)
*G06F 3/03* (2006.01)

(52) U.S. Cl.
CPC ............ *G06K 9/00389* (2013.01); *G06F 3/017* (2013.01); *G06F 3/0304* (2013.01)

(58) Field of Classification Search
CPC ...................... G06T 2207/10016; G06F 3/017; G06F 3/0304; G06K 9/00389; G06K 9/00234; G06K 9/00375; G06K 9/00355
USPC ............ 345/156–168; 382/103, 170; 715/863
See application file for complete search history.

(56) References Cited

U.S. PATENT DOCUMENTS

| | | | |
|---|---|---|---|
| 2,911,462 A | 11/1959 | Brady | |
| D212,798 S | 11/1968 | Dreyfuss | |
| 3,793,489 A | 2/1974 | Sank | |
| 3,909,121 A | 9/1975 | De Mesquita Cardoso | |
| D270,271 S | 8/1983 | Steele | |
| 4,400,724 A | 8/1983 | Fields | |
| 4,473,285 A | 9/1984 | Winter | |
| 4,494,144 A | 1/1985 | Brown | |
| 4,750,123 A | 6/1988 | Christian | |
| 4,815,132 A | 3/1989 | Minami | |
| 4,827,253 A | 5/1989 | Maltz | |
| 4,853,764 A | 8/1989 | Sutter | |
| 4,890,314 A | 12/1989 | Judd et al. | |
| 4,961,211 A | 10/1990 | Tsugane et al. | |

(Continued)

FOREIGN PATENT DOCUMENTS

| | | |
|---|---|---|
| CN | 101953158 A | 1/2011 |
| CN | 102067593 | 5/2011 |

(Continued)

OTHER PUBLICATIONS

Mathias Kolsch, Vision Based Hand Gesture Interfaces for Wearable Computing and Virtual Environments, University of California, Santa Barbara, Nov. 2004.*

(Continued)

*Primary Examiner* — Lun-Yi Lao
*Assistant Examiner* — Ibrahim Khan
(74) *Attorney, Agent, or Firm* — Patent Capital Group

(57) ABSTRACT

A method is provided in one example and includes generating a histogram associated with at least one object; receiving image data; comparing the image data to the histogram in order to determine if at least a portion of the image data corresponds to the histogram; identifying a pose associated with the object; and triggering an electronic command associated with the pose. In more particular embodiments, the image data is evaluated in order to analyze sequences of poses associated with a gesture that signals the electronic command to be performed.

20 Claims, 5 Drawing Sheets

(56) References Cited

U.S. PATENT DOCUMENTS

| | | | |
|---|---|---|---|
| 4,994,912 A | 2/1991 | Lumelsky et al. | |
| 5,003,532 A | 3/1991 | Ashida et al. | |
| 5,020,098 A | 5/1991 | Celli | |
| 5,033,969 A | 7/1991 | Kamimura | |
| 5,136,652 A | 8/1992 | Jibbe et al. | |
| 5,187,571 A | 2/1993 | Braun et al. | |
| 5,200,818 A | 4/1993 | Neta et al. | |
| 5,243,697 A | 9/1993 | Hoeber et al. | |
| 5,249,035 A | 9/1993 | Yamanaka | |
| 5,255,211 A | 10/1993 | Redmond | |
| D341,848 S | 11/1993 | Bigelow et al. | |
| 5,268,734 A | 12/1993 | Parker et al. | |
| 5,317,405 A | 5/1994 | Kuriki et al. | |
| 5,337,363 A | 8/1994 | Platt | |
| 5,347,363 A | 9/1994 | Yamanaka | |
| 5,351,067 A | 9/1994 | Lumelsky et al. | |
| 5,359,362 A | 10/1994 | Lewis et al. | |
| D357,468 S | 4/1995 | Rodd | |
| 5,406,326 A | 4/1995 | Mowry | |
| 5,423,554 A | 6/1995 | Davis | |
| 5,446,834 A | 8/1995 | Deering | |
| 5,448,287 A | 9/1995 | Hull | |
| 5,467,401 A | 11/1995 | Nagamitsu et al. | |
| 5,495,576 A | 2/1996 | Ritchey | |
| 5,502,481 A | 3/1996 | Dentinger et al. | |
| 5,502,726 A | 3/1996 | Fischer | |
| 5,506,604 A | 4/1996 | Nally et al. | |
| 5,532,737 A | 7/1996 | Braun | |
| 5,541,639 A | 7/1996 | Takatsuki et al. | |
| 5,541,773 A | 7/1996 | Kamo et al. | |
| 5,570,372 A | 10/1996 | Shaffer | |
| 5,572,248 A | 11/1996 | Allen et al. | |
| 5,587,726 A | 12/1996 | Moffat | |
| 5,612,733 A | 3/1997 | Flohr | |
| 5,625,410 A | 4/1997 | Washino et al. | |
| 5,666,153 A | 9/1997 | Copeland | |
| 5,673,401 A | 9/1997 | Volk et al. | |
| 5,675,374 A | 10/1997 | Kohda | |
| 5,689,663 A | 11/1997 | Williams | |
| 5,708,787 A | 1/1998 | Nakano et al. | |
| 5,713,033 A | 1/1998 | Sado | |
| 5,715,377 A | 2/1998 | Fukushima et al. | |
| D391,558 S | 3/1998 | Marshall et al. | |
| D391,935 S | 3/1998 | Sakaguchi et al. | |
| D392,269 S | 3/1998 | Mason et al. | |
| 5,729,471 A | 3/1998 | Jain et al. | |
| 5,737,011 A | 4/1998 | Lukacs | |
| 5,745,116 A | 4/1998 | Pisutha-Arnond | |
| 5,748,121 A | 5/1998 | Romriell | |
| D395,292 S | 6/1998 | Vu | |
| 5,760,826 A | 6/1998 | Nayar | |
| D396,455 S | 7/1998 | Bier | |
| D396,456 S | 7/1998 | Bier | |
| 5,790,182 A | 8/1998 | St. Hilaire | |
| 5,796,724 A | 8/1998 | Rajamani et al. | |
| D397,687 S | 9/1998 | Arora et al. | |
| D398,595 S | 9/1998 | Baer et al. | |
| 5,815,196 A | 9/1998 | Alshawi | |
| D399,501 S | 10/1998 | Arora et al. | |
| 5,818,514 A | 10/1998 | Duttweiler et al. | |
| 5,821,985 A | 10/1998 | Iizawa | |
| 5,825,362 A | 10/1998 | Retter | |
| D406,124 S | 2/1999 | Newton et al. | |
| 5,889,499 A | 3/1999 | Nally et al. | |
| 5,894,321 A | 4/1999 | Downs et al. | |
| D409,243 S | 5/1999 | Lonergan | |
| D410,447 S | 6/1999 | Chang | |
| 5,920,693 A | 7/1999 | Burkman et al. | |
| 5,929,857 A | 7/1999 | Dinallo et al. | |
| 5,940,118 A | 8/1999 | Van Schyndel | |
| 5,940,530 A | 8/1999 | Fukushima et al. | |
| 5,953,052 A | 9/1999 | McNelley et al. | |
| 5,956,100 A | 9/1999 | Gorski | |
| 5,996,003 A | 11/1999 | Namikata et al. | |
| D419,543 S | 1/2000 | Warren et al. | |
| D420,995 S | 2/2000 | Imamura et al. | |
| 6,069,648 A | 5/2000 | Suso et al. | |
| 6,069,658 A | 5/2000 | Watanabe | |
| 6,088,045 A | 7/2000 | Lumelsky et al. | |
| 6,097,390 A | 8/2000 | Marks | |
| 6,097,441 A | 8/2000 | Allport | |
| 6,101,113 A | 8/2000 | Paice | |
| 6,124,896 A | 9/2000 | Kurashige | |
| 6,137,485 A | 10/2000 | Kawai et al. | |
| 6,148,092 A | 11/2000 | Qian | |
| D435,561 S | 12/2000 | Pettigrew et al. | |
| 6,167,162 A | 12/2000 | Jacquin et al. | |
| 6,172,703 B1 | 1/2001 | Lee | |
| 6,173,069 B1 | 1/2001 | Daly et al. | |
| D438,873 S | 3/2001 | Wang et al. | |
| D440,575 S | 4/2001 | Wang et al. | |
| 6,211,870 B1 | 4/2001 | Foster | |
| 6,226,035 B1 | 5/2001 | Korein et al. | |
| 6,243,130 B1 | 6/2001 | McNelley et al. | |
| 6,249,318 B1 | 6/2001 | Girod et al. | |
| 6,256,400 B1 * | 7/2001 | Takata et al. | 382/103 |
| 6,259,469 B1 | 7/2001 | Ejima et al. | |
| 6,266,082 B1 | 7/2001 | Yonezawa et al. | |
| 6,266,098 B1 | 7/2001 | Cove et al. | |
| D446,790 S | 8/2001 | Wang et al. | |
| 6,285,392 B1 | 9/2001 | Satoda et al. | |
| 6,292,188 B1 | 9/2001 | Carlson et al. | |
| 6,292,575 B1 * | 9/2001 | Bortolussi et al. | 382/118 |
| D450,323 S | 11/2001 | Moore et al. | |
| D453,167 S | 1/2002 | Hasegawa et al. | |
| 6,344,874 B1 | 2/2002 | Helms et al. | |
| D454,574 S | 3/2002 | Wasko et al. | |
| 6,356,589 B1 | 3/2002 | Gebler et al. | |
| 6,380,539 B1 | 4/2002 | Edgar | |
| 6,396,514 B1 | 5/2002 | Kohno | |
| 6,424,377 B1 | 7/2002 | Driscoll, Jr. | |
| D461,191 S | 8/2002 | Hickey et al. | |
| 6,430,222 B1 | 8/2002 | Okadia | |
| 6,459,451 B2 | 10/2002 | Driscoll et al. | |
| 6,462,767 B1 | 10/2002 | Obata et al. | |
| 6,493,032 B1 | 12/2002 | Wallerstein et al. | |
| D468,322 S | 1/2003 | Walker et al. | |
| 6,507,356 B1 | 1/2003 | Jackel et al. | |
| D470,153 S | 2/2003 | Billmaier et al. | |
| 6,515,695 B1 | 2/2003 | Sato et al. | |
| D474,194 S | 5/2003 | Kates et al. | |
| 6,573,904 B1 | 6/2003 | Chun et al. | |
| 6,577,333 B2 | 6/2003 | Tai et al. | |
| 6,583,808 B2 | 6/2003 | Boulanger et al. | |
| 6,590,603 B2 | 7/2003 | Sheldon et al. | |
| 6,591,314 B1 | 7/2003 | Colbath | |
| 6,593,955 B1 | 7/2003 | Falcon | |
| 6,593,956 B1 | 7/2003 | Potts et al. | |
| D478,090 S | 8/2003 | Nguyen et al. | |
| D478,912 S | 8/2003 | Johnson | |
| 6,611,281 B2 | 8/2003 | Strubbe | |
| 6,614,781 B1 | 9/2003 | Elliott et al. | |
| D482,368 S | 11/2003 | den Toonder et al. | |
| 6,680,856 B2 | 1/2004 | Schreiber | |
| 6,693,663 B1 | 2/2004 | Harris | |
| 6,694,094 B2 | 2/2004 | Partynski et al. | |
| 6,704,048 B1 | 3/2004 | Malkin et al. | |
| 6,710,797 B1 | 3/2004 | McNelley et al. | |
| 6,751,106 B2 | 6/2004 | Zhang et al. | |
| D492,692 S | 7/2004 | Fallon et al. | |
| 6,763,226 B1 | 7/2004 | McZeal | |
| 6,768,722 B1 | 7/2004 | Katseff et al. | |
| D494,186 S | 8/2004 | Johnson | |
| 6,771,303 B2 | 8/2004 | Zhang et al. | |
| 6,774,927 B1 | 8/2004 | Cohen et al. | |
| D495,715 S | 9/2004 | Gildred | |
| 6,795,108 B2 | 9/2004 | Jarboe et al. | |
| 6,795,558 B2 | 9/2004 | Matsuo et al. | |
| 6,798,834 B1 | 9/2004 | Murakami et al. | |
| 6,801,637 B2 | 10/2004 | Voronka et al. | |
| 6,806,898 B1 | 10/2004 | Toyama et al. | |
| 6,807,280 B1 | 10/2004 | Stroud et al. | |
| 6,809,724 B1 | 10/2004 | Shiraishi et al. | |
| 6,831,653 B2 | 12/2004 | Kehlet et al. | |

(56) References Cited

U.S. PATENT DOCUMENTS

| | | |
|---|---|---|
| 6,844,990 B2 | 1/2005 | Artonne et al. |
| 6,850,266 B1 | 2/2005 | Trinca |
| 6,853,398 B2 | 2/2005 | Malzbender et al. |
| 6,867,798 B1 | 3/2005 | Wada et al. |
| 6,882,358 B1 | 4/2005 | Schuster et al. |
| 6,888,358 B2 | 5/2005 | Lechner et al. |
| D506,208 S | 6/2005 | Jewitt et al. |
| 6,909,438 B1 | 6/2005 | White et al. |
| 6,911,995 B2 | 6/2005 | Ivanov et al. |
| 6,917,271 B2 | 7/2005 | Zhang et al. |
| 6,922,718 B2 | 7/2005 | Chang |
| 6,925,613 B2 | 8/2005 | Gibson |
| 6,963,653 B1 | 11/2005 | Miles |
| D512,723 S | 12/2005 | Wirz |
| 6,980,526 B2 | 12/2005 | Jang et al. |
| 6,985,178 B1 | 1/2006 | Morita et al. |
| 6,989,754 B2 | 1/2006 | Kisacanin et al. |
| 6,989,836 B2 | 1/2006 | Ramsey |
| 6,989,856 B2 | 1/2006 | Firestone et al. |
| 6,990,086 B1 | 1/2006 | Holur et al. |
| 7,002,973 B2 | 2/2006 | MeLampy et al. |
| 7,023,855 B2 | 4/2006 | Haumont et al. |
| 7,028,092 B2 | 4/2006 | MeLampy et al. |
| 7,030,890 B1 | 4/2006 | Jouet et al. |
| 7,031,311 B2 | 4/2006 | MeLampy et al. |
| 7,036,092 B2 | 4/2006 | Sloo et al. |
| D521,521 S | 5/2006 | Jewitt et al. |
| 7,043,528 B2 | 5/2006 | Schmitt et al. |
| 7,046,862 B2 | 5/2006 | Ishizaka et al. |
| D522,559 S | 6/2006 | Naito et al. |
| 7,057,636 B1 | 6/2006 | Cohen-Solal et al. |
| 7,057,662 B2 | 6/2006 | Malzbender |
| 7,058,690 B2 | 6/2006 | Maehiro |
| 7,061,896 B2 | 6/2006 | Jabbari et al. |
| D524,321 S | 7/2006 | Hally et al. |
| 7,072,504 B2 | 7/2006 | Miyano et al. |
| 7,072,833 B2 | 7/2006 | Rajan |
| 7,080,157 B2 | 7/2006 | McCanne |
| 7,092,002 B2 | 8/2006 | Ferren et al. |
| 7,095,455 B2 | 8/2006 | Jordan et al. |
| 7,111,045 B2 | 9/2006 | Kato et al. |
| 7,126,627 B1 | 10/2006 | Lewis et al. |
| 7,131,135 B1 | 10/2006 | Virag et al. |
| 7,136,651 B2 | 11/2006 | Kalavade |
| 7,139,767 B1 | 11/2006 | Taylor et al. |
| D533,525 S | 12/2006 | Arie |
| D533,852 S | 12/2006 | Ma |
| D534,511 S | 1/2007 | Maeda et al. |
| D535,954 S | 1/2007 | Hwang et al. |
| D536,001 S | 1/2007 | Armstrong et al. |
| 7,158,674 B2 | 1/2007 | Suh |
| 7,161,942 B2 | 1/2007 | Chen et al. |
| 7,164,435 B2 | 1/2007 | Wang et al. |
| D536,340 S | 2/2007 | Jost et al. |
| D539,243 S | 3/2007 | Chiu et al. |
| 7,197,008 B1 | 3/2007 | Shabtay et al. |
| D540,336 S | 4/2007 | Kim et al. |
| D541,773 S | 5/2007 | Chong et al. |
| D542,247 S | 5/2007 | Kinoshita et al. |
| 7,221,260 B2 | 5/2007 | Berezowski et al. |
| D544,494 S | 6/2007 | Cummins |
| D545,314 S | 6/2007 | Kim |
| D547,320 S | 7/2007 | Kim et al. |
| 7,239,338 B2 | 7/2007 | Krisbergh et al. |
| 7,246,118 B2 | 7/2007 | Chastain et al. |
| D548,742 S | 8/2007 | Fletcher |
| 7,254,785 B2 | 8/2007 | Reed |
| D550,635 S | 9/2007 | DeMaio et al. |
| D551,184 S | 9/2007 | Kanou et al. |
| D551,672 S | 9/2007 | Wirz |
| 7,269,292 B2 | 9/2007 | Steinberg |
| 7,274,555 B2 | 9/2007 | Kim et al. |
| D554,664 S | 11/2007 | Van Dongen et al. |
| D555,610 S | 11/2007 | Yang et al. |
| D559,265 S | 1/2008 | Armstrong et al. |
| D560,225 S | 1/2008 | Park et al. |
| D560,681 S | 1/2008 | Fletcher |
| D561,130 S | 2/2008 | Won et al. |
| 7,336,299 B2 | 2/2008 | Kostrzewski |
| D563,965 S | 3/2008 | Van Dongen et al. |
| D564,530 S | 3/2008 | Kim et al. |
| D567,202 S | 4/2008 | Rieu Piquet |
| 7,352,809 B2 | 4/2008 | Wenger et al. |
| 7,353,279 B2 | 4/2008 | Durvasula et al. |
| 7,353,462 B2 | 4/2008 | Caffarelli |
| 7,359,731 B2 | 4/2008 | Choksi |
| 7,399,095 B2 | 7/2008 | Rondinelli |
| D574,392 S | 8/2008 | Kwag et al. |
| 7,411,975 B1 | 8/2008 | Mohaban |
| 7,413,150 B1 | 8/2008 | Hsu |
| 7,428,000 B2 | 9/2008 | Cutler et al. |
| D578,496 S | 10/2008 | Leonard |
| 7,440,615 B2 | 10/2008 | Gong et al. |
| D580,451 S | 11/2008 | Steele et al. |
| 7,450,134 B2 | 11/2008 | Maynard et al. |
| 7,471,320 B2 | 12/2008 | Malkin et al. |
| D585,453 S | 1/2009 | Chen et al. |
| 7,477,322 B2 | 1/2009 | Hsieh |
| 7,477,657 B1 | 1/2009 | Murphy et al. |
| 7,480,870 B2 | 1/2009 | Anzures et al. |
| D588,560 S | 3/2009 | Mellingen et al. |
| D589,053 S | 3/2009 | Steele et al. |
| 7,505,036 B1 | 3/2009 | Baldwin |
| D591,306 S | 4/2009 | Setiawan et al. |
| 7,518,051 B2 | 4/2009 | Redmann |
| D592,621 S | 5/2009 | Han |
| 7,529,425 B2 | 5/2009 | Kitamura et al. |
| 7,532,230 B2 | 5/2009 | Culbertson et al. |
| 7,532,232 B2 | 5/2009 | Shah et al. |
| 7,534,056 B2 | 5/2009 | Cross et al. |
| 7,545,761 B1 | 6/2009 | Kalbag |
| 7,551,432 B1 | 6/2009 | Bockheim et al. |
| 7,555,141 B2 | 6/2009 | Mori |
| D595,728 S | 7/2009 | Scheibe et al. |
| D596,646 S | 7/2009 | Wani |
| 7,575,537 B2 | 8/2009 | Ellis |
| 7,577,246 B2 | 8/2009 | Idan et al. |
| D602,033 S | 10/2009 | Vu et al. |
| D602,453 S | 10/2009 | Ding et al. |
| D602,495 S | 10/2009 | Um et al. |
| 7,607,101 B1 | 10/2009 | Barrus |
| 7,610,352 B2 | 10/2009 | AlHusseini et al. |
| 7,610,599 B1 | 10/2009 | Nashida et al. |
| 7,616,226 B2 | 11/2009 | Roessler et al. |
| 7,623,115 B2 | 11/2009 | Marks |
| 7,624,417 B2 | 11/2009 | Dua |
| D608,788 S | 1/2010 | Meziere |
| 7,646,419 B2 | 1/2010 | Cernasov |
| D610,560 S | 2/2010 | Chen |
| 7,661,075 B2 | 2/2010 | Lahdesmaki |
| 7,664,750 B2 | 2/2010 | Frees et al. |
| D612,394 S | 3/2010 | La et al. |
| 7,676,763 B2 | 3/2010 | Rummel |
| 7,679,639 B2 | 3/2010 | Harrell et al. |
| 7,692,680 B2 | 4/2010 | Graham |
| 7,707,247 B2 | 4/2010 | Dunn et al. |
| D615,514 S | 5/2010 | Mellingen et al. |
| 7,710,448 B2 | 5/2010 | De Beer et al. |
| 7,710,450 B2 | 5/2010 | Dhuey et al. |
| 7,714,222 B2 | 5/2010 | Taub et al. |
| 7,715,657 B2 | 5/2010 | Lin et al. |
| 7,716,283 B2 | 5/2010 | Thukral |
| 7,719,605 B2 | 5/2010 | Hirasawa et al. |
| 7,719,662 B2 | 5/2010 | Bamji et al. |
| 7,720,277 B2 | 5/2010 | Hattori |
| 7,725,919 B1 | 5/2010 | Thiagarajan et al. |
| D617,806 S | 6/2010 | Christie et al. |
| 7,738,457 B2 | 6/2010 | Nordmark et al. |
| D619,608 S | 7/2010 | Meziere |
| D619,609 S | 7/2010 | Meziere |
| D619,610 S | 7/2010 | Meziere |
| D619,611 S | 7/2010 | Meziere |
| 7,752,568 B2 | 7/2010 | Park et al. |
| D621,410 S | 8/2010 | Verfuerth et al. |

(56) References Cited

U.S. PATENT DOCUMENTS

| | | |
|---|---|---|
| D626,102 S | 10/2010 | Buzzard et al. |
| D626,103 S | 10/2010 | Buzzard et al. |
| 7,813,724 B2 | 10/2010 | Gronner et al. |
| D628,175 S | 11/2010 | Desai et al. |
| 7,839,434 B2 | 11/2010 | Ciudad et al. |
| 7,855,726 B2 | 12/2010 | Ferren et al. |
| 7,861,189 B2 | 12/2010 | Watanabe et al. |
| D631,891 S | 2/2011 | Vance et al. |
| D632,698 S | 2/2011 | Judy et al. |
| 7,886,048 B1 | 2/2011 | Holland et al. |
| 7,889,851 B2 | 2/2011 | Shah et al. |
| 7,890,888 B2 | 2/2011 | Glasgow et al. |
| 7,894,531 B1 | 2/2011 | Cetin et al. |
| D634,726 S | 3/2011 | Harden et al. |
| D634,753 S | 3/2011 | Loretan et al. |
| 7,899,265 B1 | 3/2011 | Rostami |
| D635,569 S | 4/2011 | Park |
| D635,975 S | 4/2011 | Seo et al. |
| 7,920,158 B1 | 4/2011 | Beck et al. |
| D637,199 S | 5/2011 | Brinda |
| D638,025 S | 5/2011 | Saft et al. |
| D638,850 S | 5/2011 | Woods et al. |
| D638,853 S | 5/2011 | Brinda |
| 7,939,959 B2 | 5/2011 | Wagoner |
| D640,268 S | 6/2011 | Jones et al. |
| D642,184 S | 7/2011 | Brouwers et al. |
| 7,990,422 B2 | 8/2011 | Ahiska et al. |
| 7,996,775 B2 | 8/2011 | Cole et al. |
| 8,000,559 B2 | 8/2011 | Kwon |
| D646,690 S | 10/2011 | Thai et al. |
| D648,734 S | 11/2011 | Christie et al. |
| D649,556 S | 11/2011 | Judy et al. |
| 8,077,857 B1 | 12/2011 | Lambert |
| 8,081,346 B1 | 12/2011 | Anup et al. |
| 8,086,076 B2 | 12/2011 | Tian et al. |
| D652,050 S | 1/2012 | Chaudhri |
| D652,429 S | 1/2012 | Steele et al. |
| D653,245 S | 1/2012 | Buzzard et al. |
| D654,926 S | 2/2012 | Lipman et al. |
| D655,279 S | 3/2012 | Buzzard et al. |
| D656,513 S | 3/2012 | Thai et al. |
| 8,130,256 B2 | 3/2012 | Trachtenberg et al. |
| 8,132,100 B2 | 3/2012 | Seo et al. |
| 8,135,068 B1 | 3/2012 | Alvarez |
| D656,948 S | 4/2012 | Knudsen et al. |
| D660,313 S | 5/2012 | Williams et al. |
| 8,179,419 B2 | 5/2012 | Girish et al. |
| 8,209,632 B2 | 6/2012 | Reid et al. |
| 8,219,404 B2 | 7/2012 | Weinberg et al. |
| 8,219,920 B2 | 7/2012 | Langoulant et al. |
| D664,985 S | 8/2012 | Tanghe et al. |
| 8,259,155 B2 | 9/2012 | Marathe et al. |
| D669,086 S | 10/2012 | Boyer et al. |
| D669,088 S | 10/2012 | Boyer et al. |
| D669,913 S | 10/2012 | Maggiotto et al. |
| 8,289,363 B2 | 10/2012 | Buckler |
| 8,294,747 B1 | 10/2012 | Weinberg et al. |
| 8,299,979 B2 | 10/2012 | Rambo et al. |
| D670,723 S | 11/2012 | Khan et al. |
| D671,136 S | 11/2012 | Barnett et al. |
| D671,141 S | 11/2012 | Peters et al. |
| 8,315,466 B2 | 11/2012 | El-Maleh et al. |
| 8,339,499 B2 | 12/2012 | Ohuchi |
| 8,363,719 B2 | 1/2013 | Nakayama |
| 8,436,888 B1 | 5/2013 | Baldino et al. |
| 2002/0047892 A1 | 4/2002 | Gonsalves |
| 2002/0106120 A1 | 8/2002 | Brandenburg et al. |
| 2002/0108125 A1 | 8/2002 | Joao |
| 2002/0113827 A1 | 8/2002 | Perlman et al. |
| 2002/0114392 A1 | 8/2002 | Sekiguchi et al. |
| 2002/0118890 A1 | 8/2002 | Rondinelli |
| 2002/0131608 A1 | 9/2002 | Lobb et al. |
| 2002/0140804 A1 | 10/2002 | Colmenarez et al. |
| 2002/0149672 A1 | 10/2002 | Clapp et al. |
| 2002/0163538 A1 | 11/2002 | Shteyn |
| 2002/0186528 A1 | 12/2002 | Huang |
| 2002/0196737 A1 | 12/2002 | Bullard |
| 2003/0017872 A1* | 1/2003 | Oishi et al. ..................... 463/33 |
| 2003/0048218 A1 | 3/2003 | Milnes et al. |
| 2003/0071932 A1 | 4/2003 | Tanigaki |
| 2003/0072460 A1 | 4/2003 | Gonopolskiy et al. |
| 2003/0160861 A1 | 8/2003 | Barlow et al. |
| 2003/0179285 A1 | 9/2003 | Naito |
| 2003/0185303 A1 | 10/2003 | Hall |
| 2003/0197687 A1 | 10/2003 | Shetter |
| 2003/0220971 A1 | 11/2003 | Kressin |
| 2004/0003411 A1 | 1/2004 | Nakai et al. |
| 2004/0032906 A1 | 2/2004 | Lillig |
| 2004/0038169 A1 | 2/2004 | Mandelkern et al. |
| 2004/0039778 A1 | 2/2004 | Read et al. |
| 2004/0061787 A1 | 4/2004 | Liu et al. |
| 2004/0091232 A1 | 5/2004 | Appling, III |
| 2004/0118984 A1 | 6/2004 | Kim et al. |
| 2004/0119814 A1 | 6/2004 | Clisham et al. |
| 2004/0164858 A1 | 8/2004 | Lin |
| 2004/0165060 A1 | 8/2004 | McNelley et al. |
| 2004/0178955 A1 | 9/2004 | Menache et al. |
| 2004/0189463 A1 | 9/2004 | Wathen |
| 2004/0189676 A1 | 9/2004 | Dischert |
| 2004/0196250 A1 | 10/2004 | Mehrotra et al. |
| 2004/0207718 A1 | 10/2004 | Boyden et al. |
| 2004/0218755 A1 | 11/2004 | Marton et al. |
| 2004/0221243 A1 | 11/2004 | Twerdahl et al. |
| 2004/0246962 A1 | 12/2004 | Kopeikin et al. |
| 2004/0246972 A1 | 12/2004 | Wang et al. |
| 2004/0254982 A1 | 12/2004 | Hoffman et al. |
| 2004/0260796 A1 | 12/2004 | Sundqvist et al. |
| 2005/0007954 A1 | 1/2005 | Sreemanthula et al. |
| 2005/0022130 A1 | 1/2005 | Fabritius |
| 2005/0024484 A1 | 2/2005 | Leonard |
| 2005/0034084 A1 | 2/2005 | Ohtsuki et al. |
| 2005/0039142 A1 | 2/2005 | Jalon et al. |
| 2005/0050246 A1 | 3/2005 | Lakkakorpi et al. |
| 2005/0081160 A1 | 4/2005 | Wee et al. |
| 2005/0099492 A1 | 5/2005 | Orr |
| 2005/0110867 A1 | 5/2005 | Schulz |
| 2005/0117022 A1 | 6/2005 | Marchant |
| 2005/0129325 A1 | 6/2005 | Wu |
| 2005/0147257 A1 | 7/2005 | Melchior et al. |
| 2005/0149872 A1 | 7/2005 | Fong et al. |
| 2005/0154988 A1 | 7/2005 | Proehl et al. |
| 2005/0223069 A1 | 10/2005 | Cooperman et al. |
| 2005/0235209 A1 | 10/2005 | Morita et al. |
| 2005/0248652 A1 | 11/2005 | Firestone et al. |
| 2005/0251760 A1 | 11/2005 | Sato et al. |
| 2005/0268823 A1 | 12/2005 | Bakker et al. |
| 2006/0013495 A1 | 1/2006 | Duan et al. |
| 2006/0017807 A1 | 1/2006 | Lee et al. |
| 2006/0028983 A1 | 2/2006 | Wright |
| 2006/0029084 A1 | 2/2006 | Grayson |
| 2006/0038878 A1 | 2/2006 | Takashima et al. |
| 2006/0048070 A1 | 3/2006 | Taylor et al. |
| 2006/0066717 A1 | 3/2006 | Miceli |
| 2006/0072813 A1 | 4/2006 | Matsumoto et al. |
| 2006/0082643 A1 | 4/2006 | Richards |
| 2006/0093128 A1 | 5/2006 | Oxford |
| 2006/0100004 A1 | 5/2006 | Kim et al. |
| 2006/0104297 A1 | 5/2006 | Buyukkoc et al. |
| 2006/0104470 A1 | 5/2006 | Akino |
| 2006/0120307 A1 | 6/2006 | Sahashi |
| 2006/0120568 A1 | 6/2006 | McConville et al. |
| 2006/0125691 A1 | 6/2006 | Menache et al. |
| 2006/0126878 A1 | 6/2006 | Takumai et al. |
| 2006/0126894 A1 | 6/2006 | Mori |
| 2006/0152489 A1 | 7/2006 | Sweetser et al. |
| 2006/0152575 A1 | 7/2006 | Amiel et al. |
| 2006/0158509 A1 | 7/2006 | Kenoyer et al. |
| 2006/0168302 A1 | 7/2006 | Boskovic et al. |
| 2006/0170769 A1 | 8/2006 | Zhou |
| 2006/0181607 A1 | 8/2006 | McNelley et al. |
| 2006/0200518 A1 | 9/2006 | Sinclair et al. |
| 2006/0233120 A1 | 10/2006 | Eshel et al. |
| 2006/0256187 A1 | 11/2006 | Sheldon et al. |
| 2006/0284786 A1 | 12/2006 | Takano et al. |

(56) References Cited

U.S. PATENT DOCUMENTS

| | | |
|---|---|---|
| 2006/0289772 A1 | 12/2006 | Johnson et al. |
| 2007/0019621 A1 | 1/2007 | Perry et al. |
| 2007/0022388 A1 | 1/2007 | Jennings |
| 2007/0039030 A1 | 2/2007 | Romanowich et al. |
| 2007/0040903 A1 | 2/2007 | Kawaguchi |
| 2007/0070177 A1 | 3/2007 | Christensen |
| 2007/0074123 A1 | 3/2007 | Omura et al. |
| 2007/0080845 A1 | 4/2007 | Amand |
| 2007/0112966 A1 | 5/2007 | Eftis et al. |
| 2007/0120971 A1 | 5/2007 | Kennedy |
| 2007/0121353 A1 | 5/2007 | Zhang et al. |
| 2007/0140337 A1 | 6/2007 | Lim et al. |
| 2007/0153712 A1 | 7/2007 | Fry et al. |
| 2007/0157119 A1 | 7/2007 | Bishop |
| 2007/0159523 A1 | 7/2007 | Hillis et al. |
| 2007/0162866 A1 | 7/2007 | Matthews et al. |
| 2007/0183661 A1 | 8/2007 | El-Maleh et al. |
| 2007/0188597 A1 | 8/2007 | Kenoyer et al. |
| 2007/0189219 A1 | 8/2007 | Navoli et al. |
| 2007/0192381 A1 | 8/2007 | Padmanabhan |
| 2007/0206091 A1 | 9/2007 | Dunn et al. |
| 2007/0206556 A1 | 9/2007 | Yegani et al. |
| 2007/0206602 A1 | 9/2007 | Halabi et al. |
| 2007/0211716 A1 | 9/2007 | Oz et al. |
| 2007/0217406 A1 | 9/2007 | Riedel et al. |
| 2007/0217500 A1 | 9/2007 | Gao et al. |
| 2007/0229250 A1 | 10/2007 | Recker et al. |
| 2007/0240073 A1 | 10/2007 | McCarthy et al. |
| 2007/0247470 A1 | 10/2007 | Dhuey et al. |
| 2007/0250567 A1 | 10/2007 | Graham et al. |
| 2007/0250620 A1 | 10/2007 | Shah et al. |
| 2007/0273752 A1 | 11/2007 | Chambers et al. |
| 2007/0279483 A1 | 12/2007 | Beers et al. |
| 2007/0279484 A1 | 12/2007 | Derocher et al. |
| 2007/0285505 A1 | 12/2007 | Korneliussen |
| 2007/0291667 A1 | 12/2007 | Huber et al. |
| 2008/0043041 A2 | 2/2008 | Hedenstroem et al. |
| 2008/0044064 A1 | 2/2008 | His |
| 2008/0046840 A1 | 2/2008 | Melton et al. |
| 2008/0068446 A1 | 3/2008 | Barkley et al. |
| 2008/0069444 A1 | 3/2008 | Wilensky |
| 2008/0077390 A1 | 3/2008 | Nagao |
| 2008/0077883 A1 | 3/2008 | Kim et al. |
| 2008/0084429 A1 | 4/2008 | Wissinger |
| 2008/0119211 A1 | 5/2008 | Paas et al. |
| 2008/0134098 A1 | 6/2008 | Hoglund et al. |
| 2008/0136896 A1 | 6/2008 | Graham et al. |
| 2008/0148187 A1 | 6/2008 | Miyata et al. |
| 2008/0151038 A1 | 6/2008 | Khouri et al. |
| 2008/0153537 A1 | 6/2008 | Khawand et al. |
| 2008/0167078 A1 | 7/2008 | Elbye |
| 2008/0198755 A1 | 8/2008 | Vasseur et al. |
| 2008/0208444 A1 | 8/2008 | Ruckart |
| 2008/0212677 A1 | 9/2008 | Chen et al. |
| 2008/0215974 A1 | 9/2008 | Harrison et al. |
| 2008/0215993 A1 | 9/2008 | Rossman |
| 2008/0218582 A1 | 9/2008 | Buckler |
| 2008/0219268 A1 | 9/2008 | Dennison |
| 2008/0232688 A1 | 9/2008 | Senior et al. |
| 2008/0232692 A1 | 9/2008 | Kaku |
| 2008/0240237 A1 | 10/2008 | Tian et al. |
| 2008/0240571 A1 | 10/2008 | Tian et al. |
| 2008/0246833 A1 | 10/2008 | Yasui et al. |
| 2008/0256474 A1 | 10/2008 | Chakra et al. |
| 2008/0261569 A1 | 10/2008 | Britt et al. |
| 2008/0266380 A1 | 10/2008 | Gorzynski et al. |
| 2008/0267282 A1 | 10/2008 | Kalipatnapu et al. |
| 2008/0276184 A1 | 11/2008 | Buffet et al. |
| 2008/0297586 A1 | 12/2008 | Kurtz et al. |
| 2008/0298571 A1 | 12/2008 | Kurtz et al. |
| 2008/0303901 A1 | 12/2008 | Variyath et al. |
| 2009/0003723 A1 | 1/2009 | Kokemohr |
| 2009/0009593 A1 | 1/2009 | Cameron et al. |
| 2009/0012633 A1 | 1/2009 | Liu et al. |
| 2009/0037827 A1 | 2/2009 | Bennetts |
| 2009/0051756 A1 | 2/2009 | Trachtenberg |
| 2009/0079812 A1 | 3/2009 | Crenshaw et al. |
| 2009/0096573 A1 | 4/2009 | Graessley |
| 2009/0115723 A1 | 5/2009 | Henty |
| 2009/0119603 A1 | 5/2009 | Stackpole |
| 2009/0122867 A1 | 5/2009 | Mauchly et al. |
| 2009/0129753 A1 | 5/2009 | Wagenlander |
| 2009/0147070 A1 | 6/2009 | Marathe et al. |
| 2009/0172596 A1 | 7/2009 | Yamashita |
| 2009/0174764 A1 | 7/2009 | Chadha et al. |
| 2009/0183122 A1 | 7/2009 | Webb et al. |
| 2009/0193345 A1 | 7/2009 | Wensley et al. |
| 2009/0204538 A1 | 8/2009 | Ley et al. |
| 2009/0207179 A1 | 8/2009 | Huang et al. |
| 2009/0207233 A1 | 8/2009 | Mauchly et al. |
| 2009/0207234 A1 | 8/2009 | Chen et al. |
| 2009/0217199 A1 | 8/2009 | Hara et al. |
| 2009/0228807 A1 | 9/2009 | Lemay |
| 2009/0244257 A1 | 10/2009 | MacDonald et al. |
| 2009/0256901 A1 | 10/2009 | Mauchly et al. |
| 2009/0260060 A1 | 10/2009 | Smith et al. |
| 2009/0265628 A1 | 10/2009 | Bamford et al. |
| 2009/0279476 A1 | 11/2009 | Li et al. |
| 2009/0324008 A1* | 12/2009 | Kongqiao et al. ............ 382/103 |
| 2009/0324023 A1 | 12/2009 | Tian et al. |
| 2010/0005419 A1 | 1/2010 | Miichi et al. |
| 2010/0008373 A1 | 1/2010 | Xiao et al. |
| 2010/0014530 A1 | 1/2010 | Cutaia |
| 2010/0027907 A1 | 2/2010 | Cherna et al. |
| 2010/0030389 A1 | 2/2010 | Palmer et al. |
| 2010/0042281 A1 | 2/2010 | Filla |
| 2010/0049542 A1 | 2/2010 | Benjamin et al. |
| 2010/0079355 A1 | 4/2010 | Kilpatrick et al. |
| 2010/0082557 A1 | 4/2010 | Gao et al. |
| 2010/0118112 A1 | 5/2010 | Nimri et al. |
| 2010/0123770 A1 | 5/2010 | Friel et al. |
| 2010/0149301 A1 | 6/2010 | Lee et al. |
| 2010/0153853 A1 | 6/2010 | Dawes et al. |
| 2010/0158387 A1 | 6/2010 | Choi et al. |
| 2010/0171807 A1 | 7/2010 | Tysso |
| 2010/0171808 A1 | 7/2010 | Harrell et al. |
| 2010/0183199 A1 | 7/2010 | Smith et al. |
| 2010/0199228 A1* | 8/2010 | Latta et al. .................. 715/863 |
| 2010/0201823 A1 | 8/2010 | Zhang et al. |
| 2010/0202285 A1 | 8/2010 | Cohen et al. |
| 2010/0205281 A1 | 8/2010 | Porter et al. |
| 2010/0205543 A1 | 8/2010 | Von Werther et al. |
| 2010/0208078 A1 | 8/2010 | Tian et al. |
| 2010/0225732 A1 | 9/2010 | De Beer et al. |
| 2010/0225735 A1 | 9/2010 | Shaffer et al. |
| 2010/0241845 A1 | 9/2010 | Alonso |
| 2010/0259619 A1 | 10/2010 | Nicholson |
| 2010/0262367 A1 | 10/2010 | Riggins et al. |
| 2010/0268843 A1 | 10/2010 | Van Wie et al. |
| 2010/0277563 A1 | 11/2010 | Gupta et al. |
| 2010/0283829 A1 | 11/2010 | De Beer et al. |
| 2010/0306703 A1 | 12/2010 | Bourganel et al. |
| 2010/0313148 A1 | 12/2010 | Hochendoner et al. |
| 2010/0316232 A1 | 12/2010 | Acero et al. |
| 2010/0325547 A1 | 12/2010 | Keng et al. |
| 2010/0329511 A1* | 12/2010 | Yoon et al. .................. 382/103 |
| 2011/0008017 A1 | 1/2011 | Gausereide |
| 2011/0029868 A1 | 2/2011 | Moran et al. |
| 2011/0032368 A1 | 2/2011 | Pelling |
| 2011/0039506 A1 | 2/2011 | Lindahl et al. |
| 2011/0063440 A1 | 3/2011 | Neustaedter et al. |
| 2011/0063467 A1 | 3/2011 | Tanaka |
| 2011/0082808 A1 | 4/2011 | Beykpour et al. |
| 2011/0085016 A1 | 4/2011 | Kristiansen et al. |
| 2011/0090303 A1 | 4/2011 | Wu et al. |
| 2011/0105220 A1 | 5/2011 | Hill et al. |
| 2011/0109642 A1 | 5/2011 | Chang et al. |
| 2011/0113348 A1 | 5/2011 | Twiss et al. |
| 2011/0164106 A1 | 7/2011 | Kim |
| 2011/0193982 A1 | 8/2011 | Kook et al. |
| 2011/0202878 A1 | 8/2011 | Park et al. |
| 2011/0225534 A1 | 9/2011 | Wala |
| 2011/0242266 A1 | 10/2011 | Blackburn et al. |
| 2011/0249081 A1 | 10/2011 | Kay et al. |

(56) References Cited

U.S. PATENT DOCUMENTS

| | | | |
|---|---|---|---|
| 2011/0249086 | A1 | 10/2011 | Guo et al. |
| 2011/0276901 | A1 | 11/2011 | Zambetti et al. |
| 2011/0279627 | A1 | 11/2011 | Shyu |
| 2011/0319885 | A1 | 12/2011 | Skwarek et al. |
| 2012/0026278 | A1 | 2/2012 | Goodman et al. |
| 2012/0038742 | A1 | 2/2012 | Robinson et al. |
| 2012/0106428 | A1 | 5/2012 | Schlicht et al. |
| 2012/0143605 | A1 | 6/2012 | Thorsen et al. |
| 2012/0169838 | A1 | 7/2012 | Sekine |
| 2012/0226997 | A1 | 9/2012 | Pang |
| 2012/0266082 | A1 | 10/2012 | Webber |
| 2012/0297342 | A1 | 11/2012 | Jang et al. |
| 2012/0327173 | A1 | 12/2012 | Couse et al. |
| 2013/0088565 | A1 | 4/2013 | Buckler |

FOREIGN PATENT DOCUMENTS

| | | |
|---|---|---|
| EP | 502600 A2 | 9/1992 |
| EP | 0 650 299 | 10/1994 |
| EP | 0 714 081 | 11/1995 |
| EP | 0 740 177 | 4/1996 |
| EP | 143745 A2 | 10/2001 |
| EP | 1 178 352 A1 | 6/2002 |
| EP | 1 589 758 A1 | 10/2005 |
| EP | 1701308 A2 | 9/2006 |
| EP | 1768058 A2 | 3/2007 |
| EP | 2073543 A1 | 6/2009 |
| EP | 2255531 | 12/2010 |
| EP | 2277308 | 1/2011 |
| GB | 2 294 605 A | 5/1996 |
| GB | 2336266 | 10/1999 |
| GB | 2355876 A | 5/2001 |
| WO | WO 94/16517 | 7/1994 |
| WO | WO 96/21321 | 7/1996 |
| WO | WO 97/08896 | 3/1997 |
| WO | WO 98/47291 | 10/1998 |
| WO | WO 99/59026 | 11/1999 |
| WO | WO 01/33840 | 5/2001 |
| WO | WO 2005/013001 A2 | 2/2005 |
| WO | WO 2005/031001 A3 | 2/2005 |
| WO | WO 2006/072755 | 7/2006 |
| WO | WO2007/106157 | 9/2007 |
| WO | WO2007/123946 | 11/2007 |
| WO | WO 2007/123960 A2 | 11/2007 |
| WO | WO 2007/123960 A3 | 11/2007 |
| WO | WO2008/039371 | 4/2008 |
| WO | WO 2008/040258 | 4/2008 |
| WO | WO 2008/101117 A1 | 8/2008 |
| WO | WO 2008/118887 A2 | 10/2008 |
| WO | WO 2008/118887 A3 | 10/2008 |
| WO | WO 2009/102503 A2 | 8/2009 |
| WO | WO 2009/102503 A3 | 8/2009 |
| WO | WO 2009/120814 A2 | 10/2009 |
| WO | WO 2009/120814 A3 | 10/2009 |
| WO | WO 2010/059481 | 5/2010 |
| WO | WO2010/096342 | 8/2010 |
| WO | WO 2010/104765 | 9/2010 |
| WO | WO 2010/132271 | 11/2010 |
| WO | WO2012/033716 | 3/2012 |
| WO | WO2012/068008 | 5/2012 |
| WO | WO2012/068010 | 5/2012 |
| WO | WO2012/068485 | 5/2012 |

OTHER PUBLICATIONS

U.S. Appl. No. 13/036,925, filed Feb. 28, 2011, entitled "System and Method for Selection of Video Data in a Video Conference Environment," Inventor(s) Sylvia Olayinka Aya Manfa N'guessan.

U.S. Appl. No. 13/096,772, filed Apr. 28, 2011, entitled "System and Method for Providing Enhanced Eye Gaze in a Video Conferencing Environment," Inventor(s): Charles C. Byers.

U.S. Appl. No. 13/106,002, filed May 12, 2011, entitled "System and Method for Video Coding in a Dynamic Environment," Inventors: Dihong Tian et al.

U.S. Appl. No. 13/098,430, filed Apr. 30, 2011, entitled "System and Method for Transferring Transparency Information in a Video Environment," Inventors: Eddie Collins et al.

U.S. Appl. No. 13/096,795, filed Apr. 28, 2011, entitled "System and Method for Providing Enhanced Eye Gaze in a Video Conferencing Environment," Inventors: Charles C. Byers.

U.S. Appl. No. 13/298,022, filed Nov. 16, 2011, entitled "System and Method for Alerting a Participant in a Video Conference," Inventor(s): TiongHu Lian, et al.

U.S. Appl. No. 29/381,245, filed Dec. 16, 2010, entitled "Interface Element," Inventor(s): John M. Kanalakis, Jr., et al.

U.S. Appl. No. 29/381,250, filed Dec. 16, 2010, entitled "Interface Element," Inventor(s): John M. Kanalakis, Jr., et al.

U.S. Appl. No. 29/381,254, filed Dec. 16, 2010, entitled "Interface Element," Inventor(s): John M. Kanalakis, Jr., et al.

U.S. Appl. No. 29/381,256, filed Dec. 16, 2010, entitled "Interface Element," Inventor(s): John M. Kanalakis, Jr., et al.

U.S. Appl. No. 29/381,259, filed Dec. 16, 2010, entitled "Interface Element," Inventor(s): John M. Kanalakis, Jr., et al.

U.S. Appl. No. 29/381,260, filed Dec. 16, 2010, entitled "Interface Element," Inventor(s): John M. Kanalakis, Jr., et al.

U.S. Appl. No. 29/381,262, filed Dec. 16, 2010, entitled "Interface Element," Inventor(s): John M. Kanalakis, Jr., et al.

U.S. Appl. No. 29/381,264, filed Dec. 16, 2010, entitled "Interface Element," Inventor(s): John M. Kanalakis, Jr., et al.

"Eye Tracking," from Wikipedia, (printed on Aug. 31, 2011) 12 pages; http://en.wikipedia.org/wiki/Eye_tracker.

"RoundTable, 360 Degrees Video Conferencing Camera unveiled by Microsoft," TechShout, Jun. 30, 2006, 1 page; http://www.techshout.com/gadgets/2006/30/roundtable-360-degrees-video-conferencing-camera-unveiled-by-microsoft/#.

"Vocative Case," from Wikipedia, [retrieved and printed on Mar. 3, 2011] 11 pages; http://en.wikipedia.org/wiki/Vocative_case.

"Eye Gaze Response Interface Computer Aid (Erica) tracks Eye movement to enable hands-free computer operation," UMD Communication Sciences and Disorders Tests New Technology, University of Minnesota Duluth, posted Jan. 19, 2005; 4 pages http://www.d.umn.edu/unirel/homepage/05/eyegaze.html.

"Andreopoulos, Yiannis, et al.,""In-Band Motion Compensated Temporal Filtering,""Signal Processing: Image Communication 19 (2004) 653-673, 21 pages http://medianetlab.ee.ucla.edu/papers/011.pdf".

Arulampalam, M. Sanjeev, et al., ""A Tutorial on Particle Filters for Online Nonlinear/Non-Gaussian Bayesian Tracking,"" IEEE Transactions on Signal Processing, vol. 50, No. 2, Feb. 2002, 15 pages http://www.cs.ubc.ca/~murphyk/Software/Kalman/ParticleFilterTutorial.pdf.

Boros, S., "Policy-Based Network Management with SNMP," Proceedings of the EUNICE 2000 Summer School Sep. 13-15, 2000, p. 3.

Cumming, Jonathan, "Session Border Control in IMS, An Analysis of the Requirements for Session Border Control in IMS Networks," Sections 1.1, 1.1.1, 1.1.3, 1.1.4, 2.1.1, 3.2, 3.3.1, 5.2.3 and pp. 7-8, Data Connection, 2005.

Dornaika F., et al., ""Head and Facial Animation Tracking Using Appearance-Adaptive Models and Particle Filters,"" 20040627; 20040627-20040602, Jun. 27, 2004, 22 pages; Heudiasy Research Lab, http://eprints.pascal-network.org/archive/00001231/01/rtvhci_chapter8.pdf.

Eisert, Peter, "Immersive 3-D Video Conferencing: Challenges, Concepts and Implementations," Proceedings of SPIE Visual Communications and Image Processing (VCIP), Lugano, Switzerland, Jul. 2003; 11 pages; http://iphome.hhi.de/eisert/papers/vcip03.pdf.

EPO Feb. 25, 2011 Communication for EP09725288.6 (published as EP22777308); 4 pages.

EPO Aug. 15, 2011 Response to EPO Communication mailed Feb. 25, 2011 from European Patent Application No. 09725288.6; 15 pages.

EPO Nov. 3, 2011 Communication from European Application EP10710949.8; 2 pages.

EPO Mar. 12, 2012 Response to EP Communication dated Nov. 3, 2011 from European Application EP10710949.8; 15 pages.

(56) References Cited

OTHER PUBLICATIONS

EPO Mar. 20, 1012 Communication from European Application 09725288.6; 6 pages.
U.S. Appl. No. 12/950,786, filed Nov. 19, 2010, entitled "System and Method for Providing Enhanced Video Processing in a Network Environment," Inventor(s): David J. Mackie.
"30 Particles Experiments in AS3 and Flash CS3," [retrieved and printed on Mar. 18, 2010]; 2 pages; http://www.flashandmath.com/advanced/fourparticles/notes.html.
active8-3D—Holographic Projection—3D Hologram Retail Display & Video Project, [retrieved and printed on Feb. 24, 2009], http://www.activ8-3d.co.uk/3d_holocubes; 1 page.
Andersson, L, et al., "LDP Specification," Network Working Group, RFC 3036, Jan. 2001, 133 pages; http://tools.ietf.org/html/rfc3036.
Arrington, Michael, "eJamming—Distributed Jamming," TechCrunch; Mar. 16, 2006; http://www.techcrunch.com/2006/03/16/ejamming-distributed-jamming/; 1 page.
Avrithis, Y., et al., "Color-Based Retrieval of Facial Images," European Signal Processing Conference (EUSIPCO '00), Tampere, Finland; Sep. 2000; http://www.image.ece.ntua.gr/~ntsap/presentations/eusipco00,ppt#256; 18 pages.
Awduche, D., et al., "Requirements for Traffic Engineering over MPLS," Network Working Group, RFC 2702, Sep. 1999, 30 pages; http://tools.ietf.org/pdf/rfc2702.pdf.
Bakstein, Hynek, et al., "Visual Fidelity of Image Based Rendering," Center for Machine Perception, Czech Technical University, Proceedings of the Computer Vision, Winter 2004, http://www.benogo.dk/publications/Bakstein-Pajdla-CVWW04.pdf; 10 pages.
Beesley, S.T.C., et al., "Active Macroblock Skipping in the H.264 Video Coding Standard," in Proceedings of 2005 Conference on Visualization, Imaging, and Image Processing—VIIP 2005, Sep. 7-9, 2005, Benidorm, Spain, Paper 480-261. ACTA Press, ISBN: 0-88986-528-0; 5 pages.
Berzin, O., et al., "Mobility Support Using MPLS and MP-BGP Signaling," Network Working Group, Apr. 28, 2008, 60 pages; http://www.potaroo.net/ietf/all-ids/draft-berzin-malls-mpls-mobility-01.txt.
Boccaccio, Jeff; CEPro, "Inside HDMI CEC: The Little-Known Control Feature," Dec. 28, 2007; http://www.cepro.com/article/print/inside_hdml_cec_the_little_known_control_feature; 2 pages.
Bücken R; "Bildfernsprechen: Videokonferenz vom Arbeitsplatz aus" Funkschau, Weka Fachzeitschriften Verlag, Poing, DE, No. 17, Aug. 14, 1986, pp. 41-43, XP002537729; ISSN: 0016-2841, p. 43, left-hand column, line 34-middle column, line 24.
Chan, Eric, et al., "Experiments on block-matching techniques for video coding," Multimedia Systems; 9 Springer-Verlag 1994, Multimedia Systems (1994) 2 pages.
Chan, et al., "Toward a Compelling Sensation of Telepresence: Demonstrating a Portal to a Distant (Static) Office," Proceedings Visualization 2000; VIS 2000; Salt Lake City, UT, Oct. 8-13, 2000; Annual IEEE Conference on Visualization, Los Alamitos, CA; IEEE Comp. Soc., US, Jan. 1, 2000, pp. 327-333; http://citeseerx.ist.psu.edu/viewdoc/summary?doi=10.1.1.35.1287.
Chen, Jason, "iBluetooth Lets iPhone Users Send and Receive Files Over Bluetooth," Mar. 13, 2009; http://i.gizmodo.com/5169545/ibluetooth-lets-iphone-users-send-and-receive-files-over-bluetooth; 1 page.
Chen, Qing, et al., "Real-time Vision-based Hand Gesture Recognition Using Haar-like Features," Instrumentation and Measurement Technology Conference, Warsaw, Poland, May 1-3, 2007, 6 pages: http://www.google.com/url?sa=t&source=web&cd=1&ved=0CB4QFjAA&url=http%3A%2F%2Fciteseerx.ist.psu.edu%2Fviewdoc%2Fdownload%3Fdol%3D10.1.1.93.103%26rep%3Drep1%26type%3Dpdf&ei=A28RTLKRDeftnQeXzZGRAw&usg=AFQjCNHpwj5MwigGp-3goVzSWad6CO-Jzw.
"Cisco Expo Germany 2009 Opening," Posted on YouTube on May 4, 2009; http://www.youtube.com/watch?v=SDKsaSlz4MK; 2 pages.
Cisco:Bill Mauchiy and Mod Marathe; UNC: Henry Fuchs, et al., "Depth-Dependent Perspective Rendering," Apr. 15, 2008, 6 pages.

Costa, Cristina, et al., "Quality Evaluation and Nonuniform Compression of Geometrically Distorted Images Using the Quadtree Distorion Map," EURASIP Journal on Applied Signal Processing, Jan. 7, 2004, vol. 2004, No. 12; © 2004 Hindawi Publishing Corp.; XP002536356; ISSN: 1110-8657; pp. 1899-1911; http://downloads.hindawi.com/journals/asp/2004/470826.pdf.
Criminisi, A., et al., "Efficient Dense-Stereo and Novel-view Synthesis for Gaze Manipulation in One-to-one Teleconferencing," Technical Rpt MSR-TR-2003-59, Sep. 2003 [retrieved and printed on Feb. 26, 2009], http://research.microsoft.com/pubs/67266/criminis_techrep2003-59.pdf, 41 pages.
"Custom 3D Depth Sensing Prototype System for Gesture Control," 3D Depth Sensing, GestureTek, 3 pages; [Retrieved and printed on Dec. 1, 2010] http://www.gesturetek.com/3ddepth/introduction.php.
Daly, S, et al., "Face-based visually-optimized image sequence-coding," Image Processing, 1998 ICIP 98. Proceedings; 1998 International Conference on Chicago, IL; Oct. 4-7, 1998, Los Alamitos; IEEE Computing; vol. 3, Oct. 4, 1998; ISBN: 978-0-8186-8821-8; XP010586786; pp. 443-447.
Diaz, Jesus, "Zcam 3D Camera is Like Wii Without Wiimote and Minority Report Without Gloves," Dec. 15, 2007; http://gizmodo.com/gadgets/zcam-depth-camera-could-be-wii-challenger/zcam-3d-camera-is-like-wii-without-wiimote-and-minority-report-without-gloves-334426.php; 3pages.
Diaz, Jesus, iPhone Bluetooth File Transfer Coming Soon (YES!); Jan. 26, 2009; http://i.gizmodo.com/5138797/iphone-bluetooth-file-transfer-coming-soon-yes; 1page.
DVE Digital Video Enterprises, "DVE Tele-Immersion Room, " [retrieved and printed on Feb. 5, 2009] http://www.dvetelepresence.com/products/immersion_room.asp; 2 pages.
"Dynamic Displays," copyright 2005-2008 [retrieved and printed on Feb. 24, 2009] http://www.zebraimaging.com/html/lighting_display.html, 2 pages.
ECmag.com, "IBS Products," Published Apr. 2009; http://www.ecmag.com/index.cfm?fa=article&articleID=10065; 2 pages.
eJamming Audio, Learn More; [retrieved and printed on May 27, 2010] http://www.ejamming.com/learnmore/; 4 pages.
Electrophysics Glossary, "Infrared Cameras, Thermal Imaging, Night Vision, Roof Moisture Detection," [retrieved and printed on Mar. 18, 2010] http://www.electrophysics.com/Browse/Brw_Glossary.asp; 11 pages.
Farrukh, A., et al., Automated Segmentation of Skin-Tone Regions in Video Sequences, Proceedings IEEE Students Conference, ISCON_apos_02; Aug. 16-17, 2002; pp. 122-128
Fiaia, Mark, "Automatic Projector Calibration Using Self-Identifying Patterns," National Research Council of Canada, Jun. 20-26, 2005; http://www.procams.org/ procams2005/papers/procams05-36.pdf; 6 pages.
Foote, J., et al., "Flycam: Practical Panoramic Video and Automatic Camera Control," in Proceedings of IEEE International Conference on Multimedia and Expo, vol. III, Jul. 30, 2000; pp. 1419-1422; http://citeseerx.ist.psu.edu/viewdoc/versions?doi=10.1.1.138.8686.
Freeman, Professor Wilson T., Computer Vision Lecture Slides, "6.869 Advances in Computer Vision: Learning and Interfaces," Spring 2005; 21 pages.
Gemmell, Jim, et al., "Gaze Awareness for Video-conferencing: A Software Approach," IEEE MultiMedia, Oct.-Dec. 2000; vol. 7, No. 4, pp. 26-35.
Gotchev, Atanas, "Computer Technologies for 3D Video Delivery for Home Entertainment," International Conference on Computer Systems and Technologies; CompSysTech, Jun. 12-13, 2008; http://ecet.ecs.ru.acad.bg/cst08/docs/cp/Plenary/P.1.pdf; 6 pages.
Gries, Dan, "3D Particles Experiments in AS3 and Flash CS3, Dan's Comments," [retrieved and printed on May 24, 2010] http://www.flashandmath.com/advanced/fourparticles/notes.html; 3 pages.
Guernsey, Lisa, "Toward Better Communication Across the Language Barrier," Jul. 29, 1999; http://www.nytimes.com/1999/07/29/technology/toward-better-communication-across-the-language-barrier.html; 2 pages.
Guili, D., et al., "Orchestral: A Distributed Platform for Virtual Musical Groups and Music Distance Learning over the Internet in JavaTM

(56) References Cited

OTHER PUBLICATIONS

Technology"; [retrieved and printed on Jun. 6, 2010] http://ieeexplore.ieee.org/stamp/stamp.jsp?tp=&arnumber=778626; 2 pages.

Gundavelli, S., et al., "Proxy Mobile IPv6," Network Working Group, RFC 5213, Aug. 2008, 93 pages; http://tools.ietf.org/pdf/rfc5213.pdf.

Habill, Nariman, et al., "Segmentation of the Face and Hands in Sign Language Video Sequences Using Color and Motion Cues" IEEE Transaction on Circuits and Systems for Video Technology, IEEE Service Venter, vol. 14, No. 8, Aug. 1, 2004; ISSN: 1051-8215; XP011115755; pp. 1086-1097.

He, L., et al., "The Virtual Cinematographer: A Paradigm for Automatic Real-Time Camera Control and Directing," Proc. SIGGRAPH, © 1996; http://research.microsoft.com/en-us/um/people/the/papers/siggraph96.vc.pdf; 8 pages.

Hepper, D., "Efficiency Analysis and Application of Uncovered Background Prediction in a Low BitRate Image Coder," IEEE Transactions on Communications, vol. 38, No. 9, pp. 1578-1584, Sep. 1990.

Holographic Imaging, "Dynamic Holography for scientific uses, military heads up display and even someday HoloTV Using TI's DMD," [retrieved and printed on Feb. 26, 2009] http://innovation.swmed.edu/research/instrumentation/res_inst_dev3d.html; 5 pages.

Hornbeck, Larry J., "Digital Light ProcessingTM: A New MEMS-Based Display Technology," [retrieved and printed on Feb. 26, 2009] http://focus.ti.com/pdfs/dlpdmd/17_Digital_Light_Processing_MEMS_display_technology.pdf; 22 pages.

"Infrared Cameras TVS-200-EX," [retrieved and printed on May 24, 2010] http://www.electrophysics.com/Browse/Brw_ProductLineCategory.asp?CategoryID=184&Area=IS; 2 pages.

IR Distribution Category @ Envious Technology, "IR Distribution Category," [retrieved and printed on Apr. 22, 2009] http://www.envioustechnology.com.au/products/product-list.php?CID=305; 2 pages.

IR Trans—Products and Orders—Ethernet Devices, [retrieved and printed on Apr. 22, 2009] http://www.irtrans.de/en/shop/lan.php; 2 pages.

Isgro, Francesco et al., "Three-Dimensional Image Processing in the Future of Immersive Media," IEEE Transactions on Circuits and Systems for Video Technology, vol. 14, No. 3; XP011108796; ISSN: 1051-8215; Mar. 1, 2004; pp. 288-303.

Itoh, Hiroyasu, et al., "Use of a gain modulating framing camera for time-resolved imaging of cellular phenomena," SPIE vol. 2979, 1997, pp. 733-740.

Jamoussi, Bamil, "Constraint-Based LSP Setup Using LDP," MPLS Working Group, Sep. 1999, 34 pages; http://tools.ietf.org/html/draft-ietf-mpls-cr-ldp-03.

Jeyatharan, M., et al., "3GPP TFT Reference for Flow Binding," MEXT Working Group, Mar. 2, 2010, 11 pages; http:/www.ietf.org/id/draft-jeyatharan-mext-flow-tftemp-reference-00.txt.

Jiang, Minqiang, et al., "On Lagrange Multiplier and Quantizer Adjustment for H.264 Frame-layer Video Rate Control," IEEE Transactions on Circuits and Systems for Video Technology, vol. 16, Issue 5, May 2006, pp. 663-669.

Kannangara, C.S., et al., "Complexity Reduction of H.264 Using Lagrange Multiplier Methods," IEEE Int. Conf. on Visual Information Engineering, Apr. 2005; www.rgu.ac.uk/files/h264_complexity_kannangara.pdf; 6 pages.

Kannangara, C.S., et al., "Low Complexity Skip Prediction for H.264 through Lagrangian Cost Estimation," IEEE Transactions on Circuits and Systems for Video Technology, vol. 16, No. 2, Feb. 2006; www.rgu.ac.uk/files/h264_skippredict_richardson_final.pdf; 20 pages.

Kauff, Peter, et al., "An Immersive 3D Video-Conferencing System Using Shared Virtual Team User Environments," Proceedings of the 4th International Conference on Collaborative Virtual Environments, XP040139458; Sep. 30, 2002; http://ip.hhi.de/imedia_G3/assets/pdfs/CVE02.pdf; 8 pages.

Kazutake, Uehira, "Simulation of 3D image depth perception in a 3D display using two stereoscopic displays at different depths," Jan. 30, 2006; http://adsabs.harvard.edu/abs/2006SPIE.6055.408U; 2 pages.

Kolsch, Mathias, "Vision Based Hand Gestures Interfaces for Wearable Computing and Virtual Environments," A Dissertation submitted in partial satisfaction of the requirements for the degree of Doctor of Philosophy in Computer Science, University of California, Santa Barbara, Nov. 2004, 288 pages; http://fulfillment.umi.com/dissertations/b7afbcb56ba72fdb14d26dfccc6b470f/1291487062/3143800.pdf.

Koyama, S., et al. "A Day and Night Vision MOS Imager with Robust Photonic-Crystal-Based RGB-and-IR," Mar. 2008, pp. 754-759; ISSN: 0018-9383; IEE Transactions on Electron Devices, vol. 55, No. 3; http://ieeexplore.ieee.org/stamp/stamp.jsp?tp=&arnumber=4455782&isnumber=4455723.

Lawson, S., "Cisco Plans TelePresence Translation Next Year," Dec. 9, 2008; http://www.pcworld.com/article/155237/.html?tk=rss_news; 2 pages.

Lee, J. and Jeon, B., "Fast Mode Decision for H.264," ISO/IEC MPEG and ITU-T VCEG Joint Video Team, Doc. JVT-J033, Dec. 2003; http://media.skku.ac.kr/publications/paper/IntC/ljy_ICME2004.pdf; 4 pages.

Liu, Z., "Head-Size Equalization for Better Visual Perception of Video Conferencing," Proceedings, IEEEInternational Conference on Multimedia & Expo (ICME2005), Jul. 6-8, 2005, Amsterdam, The Netherlands; http://research.microsoft.com/users/cohen/HeadSizeEqualizationICME2005.pdf; 4 pages.

Mann, S., et al., "Virtual Bellows: Constructing High Quality Still from Video," Proceedings, First IEEE International Conference on Image Processing ICIP-94, Nov. 13-16, 1994, Austin, TX; http://citeseerx.ist.psu.edu/viewdoc/summary?doi=10.1.1.50.8405; 5 pages.

Marvin Imaging Processing Framework, "Skin-colored pixels detection using Marvin Framework," video clip, YouTube, posted Feb. 9, 2010 by marvinproject, 1 page; http://www.youtube.com/user/marvinproject#p/a/u/0/3ZuQHYNIcrI.

Miller, Gregor, et al., "Interactive Free-Viewpoint Video," Centre for Vision, Speech and Signal Processing, [retrieved and printed on Feb. 26, 2009], http://www.ee.surrey.ac.uk/CVSSP/VMRG/Publications/miller05cvmp.pdf, 10 pages.

Miller, Paul, "Microsoft Research patents controller-free computer input via EMG muscle sensors," Engadget.com, Jan. 3, 2010, 1 page; http://www.engadget.com/2010/01/03/microsoft-research-patents-controller-free-computer-input-via-em/.

"Minoru from Novo is the worlds first consumer 3D Webcam," Dec. 11, 2008; http://www.minoru3d.com; 4 pages.

Mitsubishi Electric Research Laboratories, copyright 2009 [retrieved and printed on Feb. 26, 2009], http://www.merl.com/projects/3dtv, 2 pages.

National Training Systems Association Home—Main, Interservice/Industry Training, Simulation & Education Conference, Dec. 1-4, 2008; http://ntsa.metapress.com/app/home/main.asp?referrer=default; 1 page.

Oh, Hwang-Seok, et al., "Block-Matching Algorithm Based on Dynamic Search Window Adjustment," Dept. of CS, KAIST, 1997, 6 pages; http://citeseerx.ist.psu.edu/viewdoc/similar?doi=10.1.1.29.8621&type=ab.

Opera Over Cisco Telepresence at Cisco Expo 2009, in Hannover Germany—Apr. 28, 29, posted on YouTube on May 5, 2009; http://www.youtube.com/watch?v=xNSJNH5E-38; 1 page.

OptoIQ, "Vision + Automation Products—VideometerLab 2," [retrieved and printed on Mar. 18, 2010], http://www.optoiq.com/optoiq-2/en-us/index/machine-vision-imaging-processing/display/vsd-articles-tools-template.articles.vision-systems-design.volume-11.issue-10.departments.new-products.vision-automation-products.htmlhtml; 11 pages.

OptoIQ, "Anti-Speckle Techniques Uses Dynamic Optics," Jun. 1, 2009; http://www.optoiq.com/index/photonics-applications/lfw-display/lfw-article-display/363444/articles/optoiq2/photonics-technologies/technology-products/optical-components/optical-mems/2009/12/anti-speckle-technique-uses-dynamic-optics/QP129867/cmpid=EnlOptol.FWJanuary132010.html; 2 pages.

(56) References Cited

OTHER PUBLICATIONS

OptoIQ, "Smart Camera Supports Multiple Interfaces," Jan. 22, 2009; http://www.optoiq.com/index/machine-vision-imaging-processing/display/vsd-article-display/350639/articles/vision-systems-design/daily-product-2/2009/01/smart-camera-supports-multiple-interfaces.html; 2 pages.

OptoIQ, "Vision Systems Design—Machine Vision and Image Processing Technology," [retrieved and printed on Mar. 18, 2010], http://www.optoiq.com/index/machine-vision-imaging-processing.html; 2 pages.

Payatagool, Chris, "Orchestral Manoeuvres in the Light of Telepresence," Telepresence Options, Nov. 12, 2008; http://www.telepresenceoptions.com/2008/11/orchestral_manoeuvres; 2pages.

PCT International Preliminary Report on Patentability mailed Aug. 26, 2010 for PCT/US2009/001070; 10 pages.

PCT International Preliminary Report on Patentability mailed Oct. 7, 2010 for PCT/US2009/038310; 10 pages.

PCT International Report of Patentability dated May 15, 2006, for PCT International Application PCT/US2004/021585, 6 pages.

PCT International Search Report mailed Aug. 24, 2010 for PCT/US2010033880; 4 pages.

PCT Notification of Transmittal of the International Search Report and the Written Opinion of the International Searching Authority, or the Declaration; PCT/US2009/038310; dated Oct. 10, 2009; 19 pages.

PCT Notification of Transmittal of the International Search Report and the Written Opinion of the International Searching Authority, or the Declaration for PCT/US2009/064061 mailed Feb. 23, 2010; 14 pages.

Pixel Tools "Rate Control and H.264: H.264 rate control algorithm dynamically adjusts encoder parameters," [retrieved and printed on Jun. 10, 2010] http://www.pixeltools.om/rate_control_paper.html; 7 pages.

Radhika, N., et al., "Mobile Dynamic reconfigurable Context aware middleware for Adhoc smart spaces," vol. 22, 2008; http://www.acadjournal.com/2008/V22/part6/p7; 3 pages.

Rayvel Business-to-Business Products, copyright 2004 [retrieved and printed on Feb. 24, 2009], http://www.rayvel.com/b2b.html; 2 pages.

"Real-time Hand Motion/Gesture Detection for HCI-Demo 2," video clip, YouTube, posted Dec. 17, 2008 by smmy0705, 1 page; www.youtube.com/watch?v=mLT4CFL118A&feature=related.

Richardson, I.E.G., et al., "Fast H.264 Skip Mode Selection Using and Estimation Framework," Picture Coding Symposium, (Beijing, China), Apr. 2006; www.rgu.ac.uk/files/richardson_fast_skip_estmation_pcs06.pdf; 6 pages.

Richardson, Iain, et al., "Video Encoder Complexity Reduction by Estimating Skip Mode Distortion," Image Communication Technology Group; [Retrieved and printed Oct. 21, 2010] 4 pages; http://www4.rgu.ac.uk/files/ICIP04_richardson_zhao_final.pdf.

"Robust Face Localisation Using Motion, Colour & Fusion"; Proc. VIIth Digital Image Computing: Techniques and Applications, Sun C. et al (Eds.), Sydney: XP007905630; pp. 899-908; Dec. 10, 2003; http://www.cmis.csiro.au/Hugues.Talbot/dicta2003/cdrom/pdf/0899.pdf.

Satoh, Kiyohide et al., "Passive Depth Acquisition for 3D Image Displays", IEICE Transactions on Information and Systems, Information Systems Society, Tokyo, JP, Sep. 1, 1994, vol. E77-D, No. 9, pp. 949-957.

School of Computing, "Bluetooth over IP for Mobile Phones," 2005; http://www.computing.dcu.ie/wwwadmin/fyp-abstract/list/fyp_details05.jsp?year=2005&number=51470574; 1 page.

Schroeder, Erica, "The Next Top Model—Collaboration," Collaboration, The Workspace: A New World of Communications and Collaboration, Mar. 9, 2009; http//blogs.cisco.com/collaboration/comments/the_next_top_model; 3 pages.

Sena, "Industrial Bluetooth," [retrieved and printed on Apr. 22, 2009] http://www.sena.com/products/industrial_bluetooth; 1 page.

Shaffer, Shmuel, "Translation—State of the Art" presentation; Jan. 15, 2009; 22 pages.

Shi, C. et al., "Automatic Image Quality Improvement for Videoconferencing," IEEE ICASSP May 2004; http://research.microsoft.com/pubs/69079/0300701.pdf; 4 pages.

Shum, H.-Y, et al., "A Review of Image-Based Rendering Techniques," in SPIE Proceedings vol. 4067(3); Proceedings of the Conference on Visual Communications and Image Processing 2000, Jun. 20-23, 2000, Perth, Australia; pp. 2-13; https://research.microsoft.com/pubs/68826/review_image_rendering.pdf.

"Simple Hand Gesture Recognition," video clip, YouTube, posted Aug. 25, 2008 by pooh8210, 1 page; http://www.youtube.com/watch?v=F8GVeV0dYLM&feature=related.

Smarthome, "IR Extender Expands Your IR Capabilities," [retrieved and printed on Apr. 22, 2009], http://www.smarthome.com/8121.html; 3 pages.

Soliman, H., et al., "Flow Bindings in Mobile IPv6 and NEMO Basic Support," IETF MEXT Working Group, Nov. 9, 2009, 38 pages; http://tools.ietf.org/html/draft-ietf-mext-flow-binding-04.

Sonoma Wireworks Forums, "Jammin on Rifflink," [retrieved and printed on May 27, 2010] http://www.sonomawireworks.com/forums/viewtopic.php?id=2659; 5 pages.

Sonoma Wireworks Rifflink, [retrieved and printed on Jun. 2, 2010] http://www.sonomawireworks.com/rifflink.php; 3 pages.

Soohuan, Kim, et al., "Block-based face detection scheme using face color and motion estimation," Real-Time Imaging VIII, Jan. 20-22, 2004, San Jose, CA; vol. 5297, No. 1; Proceedings of the SPIE—The International Society for Optical Engineering SPIE-Int. Soc. Opt. Eng USA ISSN: 0277-786X; XP007905596; pp. 78-88.

Sudan, Ranjeet, "Signaling in MPLS Networks with RSVP-TE-Technology Information," Telecommunications, Nov. 2000, 3 pages; http://findarticles.com/p/articles/ml_mOTLC/is_11_34/ai_67447072/.

Sullivan, Gary J., et al., "Video Compression—From Concepts to the H.264/AVC Standard," Proceedings IEEE, vol. 93, No. 1, Jan. 2005; http://ip.hhi.de/imagecom_G1/assets/pdfs/pieee_sullivan_wiegand_2005.pdf; 14 pages.

Sun, X., et al., "Region of Interest Extraction and Virtual Camera Control Based on Panoramic Video Capturing," IEEE Trans. Multimedia, Oct. 27, 2003; http://vision.ece.ucsb.edu/publications/04mmXdsun.pdf; 14 pages.

Super Home Inspectors or Super Inspectors, [retrieved and printed on Mar. 18, 2010] http://www.urnrt.com/PageManager/Default.aspx/PageID=2120325; 3 pages.

Total immersion, Video Gallery, copyright 2008-2009 [retrieved and printed on Feb. 26, 2009], http://www.t-immersion.com/en,video-gallery,36.html, 1 page.

Trucco, E., et al., "Real-Time Disparity Maps for immersive 3-D Teleconferencing by Hybrid Recursive Matching and Census Transform," [retrieved and printed on May 4, 2010] http://server.cs.ucf.edu/~vision/papers/VidReg-final.pdf; 9 pages.

Tsapatsoulis, N., et al., "Face Detection for Multimedia Applications," Proceedings of the ICIP Sep. 10-13, 2000, Vancouver, BC, Canada; vol. 2, pp. 247-250.

Tsapatsoulis, N., et al., "Face Detection in Color Images and Video Sequences," 10th Mediterranean Electrotechnical Conference (MELECON), May 29-31, 2000; vol. 2; pp. 498-502.

Wachs, J., et al., "A Real-time Hand Gesture System Based on Evolutionary Search," Vision, $3^{rd}$ Quarter 2006, vol. 22, No. 3, 18 pages; http://web.ics.purdue.edu/~jpwachs/papers/3q06vi.pdf.

Wang, Hualu, et al., "A Highly Efficient System for Automatic Face Region Detection inMPEG Video," IEEE Transactions on Circuits and Systems for Video Technology; vol. 7, Issue 4; 1977 pp. 615-628.

Wang, Robert and Jovan Popovic, "Real-Time Hand-Tracking with a Color Glove, ACM Transaction on Graphics" (SIGGRAPH 2009),28(3), Aug. 2009; 8 pages http://people.csall.mit.edu/rywang/handtracking/s09-hand-tracking.pdf.

Wang, Robert and Jovan Popovic, "Real-Time Hand-Tracking with a Color Glove, ACM Transaction on Graphics," 4 pages, [Retrieved and printed on Dec. 1, 2010] http://people.csail.mit.edu/rywang/hand.

Wang, Robert and Jovan Popovic, "Gestural user input," video clip, YouTube, posted by rkeitset on May 19, 2010, 1 page; http://www.youtube.com/watch?v=3JWYTtBjdTE.

(56) References Cited

OTHER PUBLICATIONS

Wang, Robert and Jovan Popovic, "Tracking the 3D pose and configuration of the hand," video clip, YouTube, posted by rkeltset on Mar. 31, 2010, 1 page; http://www.youtube.com/watch?v=JOXwjkWP6Sw.

Wang, Robert and Jovan Popovic, "Desktop vitrual reality," video clip, YouTube, posted by rkeltset on Apr. 8, 2010, 1 page; http://www.youtube.com/watch?v=9rBtm62Lkfk.

Wang, Robert and Jovan Popovic, "Bimanual rotation and scaling," video clip, YouTube, posted by rkeltset on Apr. 14, 2010, 1 page; http://www.youtube.com/watch?v=7TPFSCX79U.

Wang, Robert and Jovan Popovic, "Manipulating a virtual yoke," video clip, YouTube, posted by rkeltset on Jun. 8, 2010, 1 page; http://www.youtube.com/watch?v=UfgGOO2uM.

Westerink, P.H., et al., "Two-pass MPEG-2 variable bitrate encoding," IBM Journal of Research and Development, Jul. 1991, vol. 43, No. 4; http://citeseerx.ist.psu/viewdoc/summary?doi=10.1.1.128.421; 18 pages.

Wiegand, T., et al., "Efficient mode selection for block-based motion compensated video coding," Proceedings, 2005 International Conference on Image Processing IIP 2005, pp. 2559-2562; citeseer.ist.psu.edu/wiegand95efficient.html.

Wiegand, T., et al., "Rate-distortion optimized mode selection for very low bit rate video coding and the emerging H.263 standard," IEEE Trans. Circuits Syst. Video Technol., Apr. 1996, vol. 6, No. 2, pp. 182-190.

Wi-Fi Protected Setup, from Wikipedia, Sep. 2, 2010, 3 pages http://en.wikipedia.org/wiki/Wi-Fi_Protected_Setup.

Wilson, Mark, "Dreamoc 3D Display Turns Any Phone Into Hologram Machine," Oct. 30, 2008; http://gizmodo.com/5070906/dreamoc-3d-display-turns-any-phone-into-hologram-machine; 2 pages.

WirelessDevNet, Melody Launches Bluetooth Over IP, [retrieved and printed on Jun. 5, 2010] http://www.wirelessdevnet.com/news/2001/155/news5.html; 2 pages.

Xia, F., et al., "Home Agent Initiated Flow Binding for Mobile IPv6," Network Group, Oct. 19, 2009, 15 pages; http://tools.ietf.orghtml/draft-xia-mext-ha-init-flow-binding-01.txt.

Xin, Jun, et al., "Efficient macroblock coding-mode decision for H.264/AVC video coding," Technical Repot MERL 2004-079, Mitsubishi Electric Research Laboratories, Jan. 2004; www.merl.com/publications/TR2004-079/; 12 pages.

Yang, Jie, et al., "A Real-Time Face Tracker," Proceedings 3rd IEEE Workshop on Applications of Computer Vision; 1996; Dec. 2-4, 1996; pp. 142-147; http://www.ri.cmu.edu/pub_files/pub1/yang_jie_1996_1/yang_jie_1996_1.pdf.

Yang, Ming-Hsuan, et al., "Detecting Faces in Images; A Survey," vol. 24, No. 1; Jan. 2002; pp. 34-58; http://vision.al.uluc.edu/mhyang/papers/pami02a.pdf.

Yang, Ruigang, et al., "Real-Time Consensus-Based Scene Reconstruction using Commodity Graphics Hardware," Department of Computer Science, University of North Carolina at Chapel Hill; 2002; http://www.cs.unc.edu/Research/stc/publications/yang_pacigra2002.pdf: 10 pages.

Yang, Xiaokang, et al., Rate Control for H.264 with Two-Step Quantization Parameter Determination but Single-Pass Encoding, EURASIP Journal on Applied Signal Processing, Jun. 2006; http://downloads.hindawi.com/journals/asp/2006/063409.pdf; 13 pages.

Yegani, P. et al., "GRE Key Extension for Mobile IPv4," Network Working Group, Feb. 2006, 11 pages: http://tools.ietf.org/pdf/draft-yegani-gre-key-extension-01.pdf.

Yoo, Byounghun, et al., "Image-Based Modeling of Urban Buildings Using Aerial Photographs and Digital Maps," Transactions in GIS, 2006, 10(3): p. 377-394.

Zhong, Ren, et al., "Integration of Mobile IP and MPLS," Network Working Group, Jul. 2000, 15 pages; http://tools.ietf.org/html/draft-zhong-mobile-ip-mpls-01.

"Oblong Industries is the developer of the g-speak spatial operation environment," Oblong Industries Information Page, 2 pages, [Retrieved and printed on Dec. 1, 2010] http://oblong.com.

Underkoffler, John, "G-Speak Overview 1828121108," video clip, Vimeo.com, 1 page, [Retrieved and printed on Dec. 1, 2010] http://vimeo.com/2229299.

Kramer, Kwindla, "Mary Ann de Lares Norris at Thinking Digital," Oblong Industries, Inc. Web Log, Aug. 24, 2010; 1 page; http://oblong.com/articles/OBS6hEeJmoHoCwgJ.html.

"Mary Ann de Lares Norris," video clip, Thinking Digital 2010 Day Two, Thinking Digital Videos, May 27, 2010, 3 pages; http://videos.thinkingdigital.co.uk/2010/05/mary-ann-de-lares-norris-oblong/.

Kramer, Kwindla, "Oblong at TED," Oblong Industries, Inc. Web Log, Jun. 6, 2010, 1 page; http://oblong.com/article/OB22LFIS1NVyrOmR.html.

"John Underkoffler points to the future of UI," video clip and interactive transcript, Video on TED.com, Jun. 2010, 6 pages; http://www.ted.com/talks/john_underkoffler_drive_3d_data_with_$_{L\ a\_}$gesture.html.

Kramer, Kwindla, "Oblong on Bloomberg TV," Oblong Industries, Inc. Web Log, Jan. 28, 2010, 1 page; http://oblong.com/article/0AN_1KD9q990PEnw.html.

Kramer, Kwindla, "g-speak at RISD, Fall 2009," Oblong industries, Inc. Web Log, Oct. 29, 2009, 1 page; http://oblong.com/article/09uW060q6xRIZYvm.html.

Kramer, Kwindla, "g-speak + TMG," Oblong Industies, Inc. Web Log, Mar. 24, 2009, 1 page; http://oblong.com/article/08mM77zpYMm7kFtv.html.

"g-stalt version 1," video clip, YouTube.com, posted by zigg1es on Mar. 15, 2009, 1 page; http://youtube.com/watch?v=k8ZAql4rndvk.

Underkoffler, John, "Carlton Sparrell speaks at MIT," Oblong Industries, Inc. Web Log, Oct. 30, 2009, 1 page; http://oblong.com/article/09usAB4l1Ukb6CPw.html.

Underkoffler, John, "Carlton Sparrell at MIT Media Lab," video clip, Vimeo.com, 1 page, [Retrieved and printed Dec. 1, 2010] http://vimeo.com/7355992.

Underkoffler, John, "Oblong at Altitude: Sundance 2009," Oblong Industries, Inc. Web log, Jan. 20. 2009, 1 page; http://oblong.com/article/08Sr62ron_2akg00.html.

Underkoffler, John, "Oblong's tamper system 1801011309," video clip, Vimeo.com, 1 page, [Retrieved and printed Dec. 1, 2010] http://vimeo.com/2821182.

Feld, Brad, "Science Fact," Oblong Industries, Inc. Web Log, Nov. 13, 2008, 2 pages, http://oblong.com/article/084H-PKISTb914Ti.html.

Kwindla Kramer, "g-speak in slices," Oblong Industries, Inc. Web Log, Nov. 13, 2008, 6 pages; http://oblong.com/article/08661qfNrFg1NeuK.html.

Underkoffler, John, "Origins: arriving here," Oblong Industries, Inc. Web Log, Nov. 13, 2008, 5 pages; http://oblong.com/article/085zBpRSY9JeLv2z.html.

Rishel, Christian, "Commercial overview: Platform and Products," Oblong Industries, Inc. Nov. 13, 2008, 3 pages; http://oblong.com/article/086E19gPvDcktAf9.html.

U.S. Appl. No. 12/234,291, filed Sep. 19, 2008, entitled "System and Method for Enabling Communication Sessions in a Network Environment," Inventors: Yifan Gao et al.

U.S. Appl. No. 12/366,593, filed Feb. 5, 2009, entitled "System and Method for Depth Perspective Image Rendering," Inventors: J. William Mauchly et al.

U.S. Appl. No. 12/475,075, filed May 29, 2009, entitled "System and Method for Extending Communications Between Participants in a Conferencing Environment," Inventors: Brian J. Baldino et al.

U.S. Appl. No. 12/400,540, filed Mar. 9, 2009, entitled "System and Method for Providing Three Dimensional Video Conferencing in a Network Environment," Inventors: Karthik Dakshinamoorthy et al.

U.S. Appl. No. 12/400,582, filed Mar. 9, 2009, entitled "System and Method for Providing Three Dimensional Imaging in a Network Environment," Inventors: Shmuel Shaffer et al.

U.S. Appl. No. 12/539,461, filed Aug. 11, 2009, entitled "System and Method for Verifying Parameters in an Audiovisual Environment," Inventor: James M. Alexander.

U.S. Appl. No. 12/463,505, filed May 11, 2009, entitled "System and Method for Translating Communications Between Participants in a Conferencing Environment," Inventors: Marthinus F. De Beer et al.

(56) References Cited

OTHER PUBLICATIONS

U.S. Appl. No. 12/727,089, filed Mar. 18, 2010, entitled "System and Method for Enhancing Video Images in a Conferencing Environment," Inventors: Joseph T. Friel.
U.S. Appl. No. 12/781,722, filed May 17, 2010, entitled "System and Method for Providing Retracting Optics in a Video Conferencing Environment," Inventor(s): Joseph T. Friel, et al.
U.S. Appl. No. 12/877,833, filed Sep. 8, 2010, entitled "System and Method for Skip Coding During Video Conferencing in a Network Environment," Inventors: Dihong Tian et al.
U.S. Appl. No. 12/870,687, filed Aug. 27, 2010, entitled "System and Method for Producing a Performance Via Video Conferencing in a Network Environment," Inventors: Michael A. Arnao et al.
U.S. Appl. No. 12/912,556, filed Oct. 26, 2010, entitled "System and Method for Provisioning Flows in a Mobile Network Environment," Inventors: Balaji Vankat Vankataswami, et al.
U.S. Appl. No. 12/949,614, filed Nov. 18, 2010, entitled "System and Method for Managing Optics in a Video Environment," Inventors: Torence Lu, et al.
U.S. Appl. No. 12/873,100, filed Aug. 31, 2010, entitled "System and Method for Providing Depth Adaptive Video Conferencing," Inventors: J. William Mauchly et al.
U.S. Appl. No. 12/946,679, filed Nov. 15, 2010, entitled "System and Method for Providing Camera Functions in a Video Environment," Inventors: Peter A.J. Fornell, et al.
U.S. Appl. No. 12/946,695, filed Nov. 15, 2010, entitled "System and Method for Providing Enhanced Audio in a Video Environment," Inventors: Wei Li, et al.
U.S. Appl. No. 12/907,914, filed Oct. 19, 2010, entitled "System and Method for Providing Videomail in a Network Environment," Inventors: David J. Mackie et al.
U.S. Appl. No. 12/907,919, filed Oct. 19, 2010, entitled "System and Method for Providing Connectivity in a Network Environment," Inventors: David J. Mackie et al.
U.S. Appl. No. 12/946,704, filed Nov. 15, 2010, entitled "System and Method for Providing Enhanced Graphics in a Video Environment," Inventors: John M. Kanalakis, Jr., et al.
U.S. Appl. No. 12/907,925, filed Oct. 19, 2010, entitled "System and Method for Providing a Pairing Mechanism in a Video Environment," Inventors: Gangfeng Kong et al.
U.S. Appl. No. 12/939,037, filed Nov. 3, 2010, entitled "System and Method for Managing Flows in a Mobile Network Environment," Inventors: Balaji Venkat Venkataswami et al.
U.S. Appl. No. 12/946,709, filed Nov. 15, 2010, entitled "System and Method for Providing Enhanced Graphics in a Video Environment," Inventors: John M. Kanalakis, Jr., et al.
U.S. Appl. No. 12/784,257, filed May 20, 2010, entitled "Implementing Selective Image Enhancement," Inventors: Dihong Tian et al.
Design U.S. Appl. No. 29/375,624, filed Sep. 24, 2010, entitled "Mounted Video Unit," Inventor(s): Ashok T. Desai et al.
Design U.S. Appl. No. 29/375,627, filed Sep. 24, 2010, entitled "Mounted Video Unit," Inventor(s): Ashok T. Desai et al.
Design U.S. Appl. No. 29/369,951, filed Sep. 15, 2010, entitled "Video Unit With Integrated Features," Inventor(s): Kyle A. Buzzard et al.
Design U.S. Appl. No. 29/375,458, filed Sep. 22, 2010, entitled "Video Unit With Integrated Features," Inventor(s): Kyle A. Buzzard et al.
Design U.S. Appl. No. 29/358,009, filed Mar. 21, 2010, entitled "Free- Standing Video Unit," Inventor(s): Ashok T. Desai et al.
Design U.S. Appl. No. 29/375,619, filed Sep. 24, 2010, entitled "Freestanding Video Unit," Inventor(s): Ashok T. Desai et al.
PCT "International Search Report and the Written Opinion of the International Searching Authority, or the Declaration," PCT/US2010/026456, dated Jun. 29, 2010; 11 pages.
PCT "Notification of Transmittal of the International Search Report and the Written Opinion of the International Searching Authority, or the Declaration," PCT/US2009/001070, dated Apr. 4, 2009; 14 pages.
PCT "Notification of Transmittal of the International Search Report and the Written Opinion of the International Searching Authority, or the Declaration," PCT/US2009/038310; dated Oct. 10, 2009; 17 pages.
PCT "International Preliminary Report on Patentability and Written Opinion of the International Searching Authority," PCT/US2009/038310; dated Sep. 28, 2010; 10 pages.
PCT "International Preliminary Report on Patentability dated Sep. 29, 2009, International Search Report, and Written Opinion," for PCT International Application PCT/US2008/058079; dated Sep. 18, 2008, 10 pages.
Joshua Gluckman and S.K. Nayar, "Rectified Catadioptric Stereo Sensors," 8 pages, retrieved and printed on May 17, 2010; http://cis.poly.edu/~gluckman/papers/cvpr00.pdf.
France Telecom R&D, "France Telecom's Magic Telepresence Wall—Human Productivity Lab," 5 pages, retrieved and printed on May 17, 2010; http://www.humanproductivitylab.com/archive_blogs/2006/07/11/france_telecoms_magic_telepres_1.php.
Digital Video Enterprises, "DVE Eye Contact Silhouette," 1 page, © DVE 2008; http://www.dvetelepresence.com/products/eyeContactSilhouette.asp.
R.V. Kollarits, et al., "34.3: An Eye Contact Camera/Display System for Videophone Applications Using a Conventional Direct-View LCD," © 1995 SID, ISSN0097-0966X/95/2601, pp. 765-768; http://citeseerx.ist.psu.edu/viewdoc/download;jsessionid=47A1E7E028C26503975E633895D114EC?doi=10.1.1.42.1772&rep=rep1&type=pdf.
Trevor Darrell, "A Real-Time Virtual Mirror Display," 1 page, Sep. 9, 1998; http://people.csail.mit.edu/trevor/papers/1998-021/node6.html.
3G, "World's First 3G Video Conference Service with New TV Commercial," Apr. 28, 2005, 4 pages; http://www.3g.co.uk/PR/April2005/1383.htm.
Video on TED.com, Pranav Mistry: the Thrilling Potential of SixthSense Technology (5 pages) and Interactive Transcript (5 pages), retrieved and printed on Nov. 30, 2010; http://www.ted.com/talks/pranav_mistry_the_thrilling_potential_of_sixthsense_technology.html.
Chien et al., "Efficient moving Object Segmentation Algorithm Using Background Registration Technique," IEEE Transactions on Circuits and Systems for Video Technology, vol. 12, No. 7, Jul. 2002, 10 pages.
Nakaya, Y., et al. ""Motion Compensation Based on Spatial Transformations," IEEE Transactions on Circuits and Systems for Video Technology, Jun. 1994, Abstract Only http://ieeexplore.ieee.org/Xplore/login.jsp?url=http%3A%2F%2Fieeexplore.ieee.org%2Fiel5%2F76%2F7495%2F00305878.pdf%3Farnumber%3D305878&authDecision=-203".
Patterson, E.K., et al., ""Moving-Talker, Speaker-Independent Feature Study and Baseline Results Using the CUAVE Multimodal Speech Corpus," EURASIP Journal on Applied Signal Processing, vol. 11, Oct. 2002, 15 pages http://www.clemson.edu/ces/speech/papers/CUAVE_Eurasip2002.pdf".
Perez, Patrick, et al., ""Data Fusion for Visual Tracking with Particles," Proceedings of the IEEE, vol. XX, No. XX, Feb. 2004, 18 pages http://citeseer.ist.psu.edu/viewdoc/summary?doi=10.1.1.6.2480".
Potamianos, G., et a., "An Image Transform Approach for HMM Based Automatic Lipreading,""in Proceedings of IEEE ICIP, vol. 3, 1998, 5 pages http://citeseerx.ist.psu.edu/viewdoc/summary?doi=10.1.1.13.6802".
Rikert, T.D., et al., ""Gaze Estimation using Morphable models," IEEE International Conference on Automatic Face and Gesture Recognition, Apr. 1998; 7 pgs http://citeseer.ist.psu.edu/viewdoc/summary?doi=10.1.1.30.9472".
Tan, Kar-Han, et al., ""Appearance-Based Eye Gaze Estimation," In Proceedings IEEE WACV'02, 2002, 5 pages http://citeseer.ist.psu.edu/viewdoc/summary?doi=10.1.1.19.8921".
Veratech Corp., "Phantom Sentinel," © VeratechAero 2006, 1 page; http://www.veratechcorp.com/phantom.html.
Vertegaal, Roel, et al., "GAZE-2: Conveying Eye Contact in Group Video Conferencing Using Eye-Controlled Camera Direction," CHI

(56) References Cited

OTHER PUBLICATIONS

2003, Apr. 5-10, 2003, Fort Lauderdale, FL; Copyright 2003 ACM 1-58113-630-7/03/0004; 8 pages; http://www.hml.queensu.ca/papers/vertegaalchi0403.pdf.
Garg, Ashutosh, et al., ""Audio-Visual ISpeaker Detection Using Dynamic Bayesian Networks,"" IEEE International Conference on Automatic Face and Gesture Recognition, 2000 Proceedings, 7 pages http://www.ifp.illinois.edu/~ashutosh/papers/FG00.pdf.
Geys et al., "Fast Interpolated Cameras by Combining a GPU Based Plane Sweep With a Max-Flow Regularisation Algorithm," Sep. 9, 2004; 3D Data Processing, Visualization and Transmission 2004, pp. 534-541.
Gussenhoven, Carlos, "Chapter 5 Transcription of Dutch Intonation," Nov. 9, 2003, 33 pages; http://www.ru.nl/publish/pages/516003/todisun-ah.pdf.
Gvili, Ronen et al., "Depth Keying," 3DV System Ltd., [Retrieved and printed on Dec. 5, 2011] 11 pages; http://research.microsoft.com/en-us/um/people/eyalofek/Depth%20Key/DepthKey.pdf.
Hammadi, Nait Charif et al., ""Tracking the Activity of Participants in a Meeting,"" Machine Vision and Applications, Springer, Berlin, De Lnkd—DOI:10.1007/S00138-006-0015-5, vol. 17, No. 2, May 1, 2006, pp. 83-93, XP019323925 http://citeseerx.ist.psu.edu/viewdoc/summary?doi=10.1.1.106.9832.
Hock, Hans Henrich, "Prosody vs. Syntax: Prosodic rebracketing of final vocatives in English," 4 pages; [retrieved and printed on Mar. 3, 2011] http://speechprosody2010.illinois.edu/papers/100931.pdf.
Jong-Gook Ko et al., ""Facial Feature Tracking and Head Orientation-Based Gaze Tracking,"" ITC-CSCC 2000, International Technical Conference on Circuits/Systems, Jul. 11-13, 2000, 4 pages http://www.umiacs.unrid.edu/~knkim/paper/itc-cscc-2000-jgko.pdf.
Keijser, Jeroen, et al., "Exploring 3D Interaction in Alternate Control-Display Space Mappings," IEEE Symposium on 3D User Interfaces, Mar. 10-11, 2007, pp. 17-24.
Kim, Y.H., et al., "Adaptive mode decision for H.264 encoder," Electronics letters, vol. 40, Issue 19, pp. 1172-1173, Sep. 2004; 2 pages.
Klint, Josh, "Deferred Rendering in Leadwerks Engine," Copyright Leadwerks Corporation © 2008; http://www.leadwerks.com/files/Deferred_Rendering_in_Leadwerks_Engine.pdf; 10 pages.
Kwolek, B., "Model Based Facial Pose Tracking Using a Particle Filter," Geometric Modeling and Imaging—New Trends, 2006 London, England Jul. 5-6, 2005, Piscataway, NJ, USA, IEEE LNKD-DOI: 10.1109/GMAI.2006.34 Jul. 5, 2006, pp. 203-208; XP010927285 [Abstract Only].
Lambert, "Polycom Video Communications," © 2004 Polycom, Inc., Jun. 20, 2004 http://www.polycom.com/global/documents/whitepapers/video_communications_h.239_people_content_polycom_patented_technology.pdf.
Liu, Shan, et al., ""Bit-Depth Scalable Coding for High Dynamic Range Video,"" SPIE Conference on Visual Communications and Image Processing, Jan. 2008; 12 pages http://www.merl.com/papers/docs/TR2007-078.pdf.
PCT Oct. 12, 2011 International Search Report and Written Opinion of the ISA from PCT/US2011/050380.
PCT Nov. 24, 2011 International Preliminary Report on Patentability from International Application Serial No. PCT/US2010/033880; 6 pages.
PCT Aug. 23, 2011 International Preliminary Report on Patentability and Written Opinion of the ISA from PCT/US2010/024059; 6 pages.
PCT Sep. 13, 2011 International Preliminary Report on Patentability and the Written Opinion of the ISA from PCT/US2010/026456; 5 pages.
PCT Jan. 23, 2012 International Search Report and Written Opinion of the ISA from International Application Serial No. PCT/US2011/060579; 10 pages.
PCT Jan. 23, 2012 International Search Report and Written Opinion of the ISA from International Application Serial No. PCT/US2011/060584; 11 pages.
PCT Feb. 20, 2012 International Search Report and Written Opinion of the ISA from International Application Serial No. PCT/US2011/061442; 12 pages.
PCT Mar. 21, 2013 International Preliminary Report on Patentability from International Application Serial No. PCT/US2011/050380.
PRC Aug. 3, 2012 SIPO First Office Action from Chinese Application No. 200980119121.5; 16 pages.
PRC Dec. 18, 2012 Response to SIPO First Office Action from Chinese Application No. 200980119121.5; 16 pages.
PRC Jan. 7, 2013 SIPO Second Office Action from Chinese Application Serial No. 200980105262.1.
PRC Apr. 3, 2013 SIPO Second Office Action from Chinese Application No. 200980119121.5; 16 pages.
Weinstein et al., ""Emerging Technologies for Teleconferencing and Telepresence,"" Wainhouse Research 2005 http://www.ivci.com/pdf/whitepaper-emerging-technologies-for-teleconferencing-and-telepresence.pdf.
EPO Jul. 10, 2012 Response to EP Communication from European Application EP10723445.2.
EPO Sep. 24, 2012 Response to Mar. 20, 2012 EP Communication from European Application EP09725288.6.
PCT Sep. 25, 2007 Notification of Transmittal of the International Search Report from PCT/US06/45895.
PCT Sep. 2, 2008 International Preliminary Report on Patentability (1 page) and the Written Opinion of th ISA (4 pages) from PCT/US2006/045895.
PCT Sep. 11, 2008 Notification of Transmittal of the International Search Report from PCT/US07/09469.
PCT Nov. 4, 2008 International Preliminary Report on Patentability (1 page) and the Written Opinion of the ISA (8 pages) from PCT/US2007/009469.
PCT May 11, 2010 International Search Report from PCT/US2010/024059; 4 pages.
PCT May 30, 2013 International Preliminary Report on Patentability and Written Opinion from the International Searching Authority for International Application Serial No. PCT/US2011/061442 8 pages.
PCT May 30, 2013 International Preliminary Report on Patentability and Written Opinion from the International Searching Authority for International Application Serial No. PCT/US2011/060579 6 pages.
PCT May 30, 2013 International Preliminary Report on Patentability and Written Opinion from the International Searching Authority for International Application Serial No. PCT/US2011/060584 7 pages.
PRC Jun. 18, 2013 Response to SIPO Second Office Action from Chinese Application No. 200980119121.5; 5 pages.
U.S. Appl. No. 14/055,427, filed Oct. 16, 2013, entitled "System and Method for Provisioning Flows in a Mobile Network Environment," Inventors: Balaji Vankat Vankataswami, et al.
U.S. Appl. No. 14/154,608, filed Jan. 14, 2014, entitled "System and Method for Extending Communications Between Participants in a Conferencing Environment," Inventors: Brian Baldino, et al.
PRC Jul. 9, 2013 SIPO Third Office Action from Chinese Application No. 200980119121.5; 15 pages.
PRC Aug. 28, 2013 SIPO First Office Action from Chinese Application No. 201080010988.X 7 pages.
PRC Nov. 26, 2013 SIPO First Office Action from Chinese Application No. 201080020670 5pgs.
PRC May 5, 2014 SIPO Second Office Action from Chinease Application No. 201080010988.x (English Translation Only).

\* cited by examiner

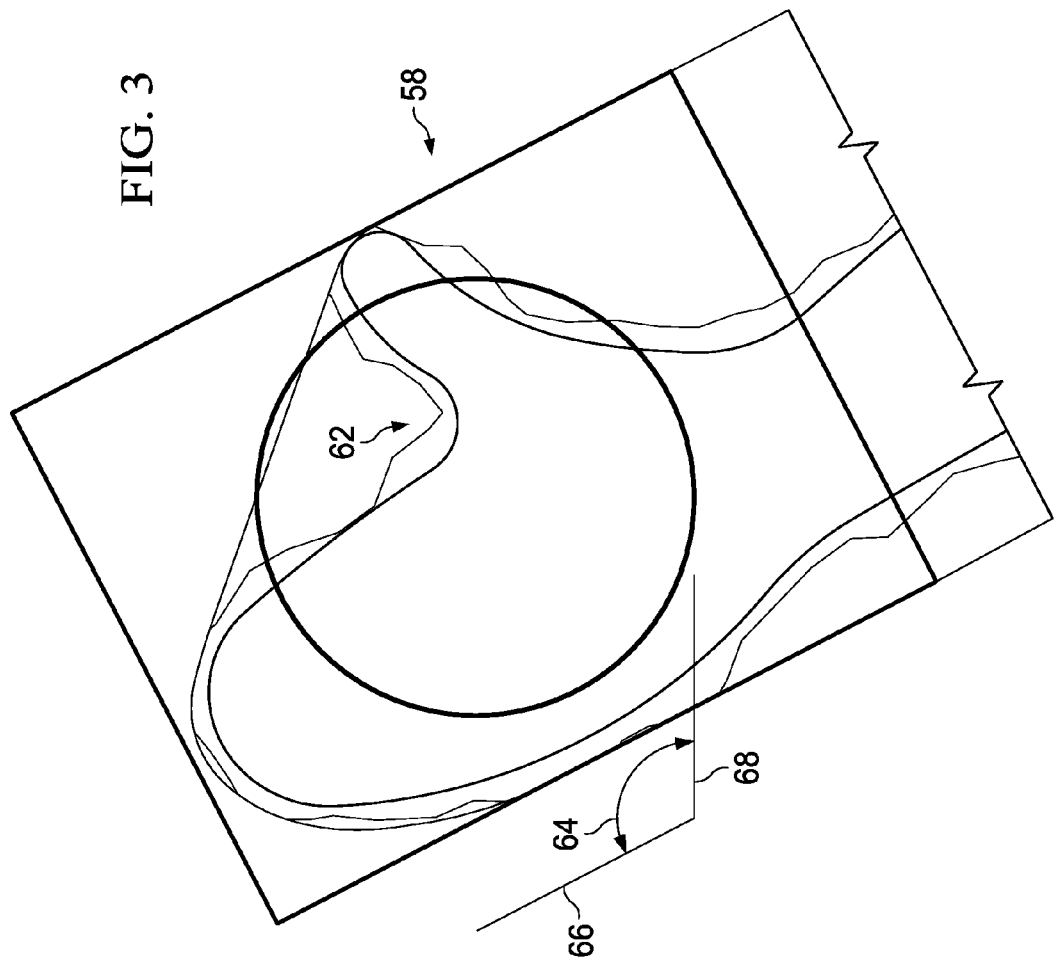

FIG. 4

| FRAME N+1 / FRAME N | ○ ○ | ● ○ | ○ ● | ● ● |
|---|---|---|---|---|
| ○ ○ | NO ACTION | MOUSE DOWN (LEFT HAND) | MOUSE DOWN (RIGHT HAND) | NO ACTION |
| ● ○ | DRAG (LEFT HAND) MOUSE UP (LEFT HAND) | DRAG (LEFT HAND) | DRAG (LEFT HAND) MOUSE UP (LEFT HAND) MOUSE DOWN (RIGHT HAND) | DRAG (LEFT HAND) |
| ○ ● | DRAG (RIGHT HAND) MOUSE UP (RIGHT HAND) | DRAG (RIGHT HAND) MOUSE UP (RIGHT HAND) MOUSE DOWN (LEFT HAND) | DRAG (RIGHT HAND) | DRAG (RIGHT HAND) |
| ● ● | PINCH / ZOOM / ROTATE / TILT | PINCH / ZOOM / ROTATE / TILT | PINCH / ZOOM / ROTATE / TILT | PINCH / ZOOM / ROTATE / TILT |

 "OPEN"
 "CLOSED"

SYSTEM AND METHOD FOR GESTURE INTERFACE CONTROL

TECHNICAL FIELD

This disclosure relates in general to the field of communications and, more particularly, to controlling a computer interface through gestures.

BACKGROUND

As a general proposition, hand gestures are natural, intuitive human communication tools. Human machine interfaces are growing in importance, as machines proliferate and as human-machine interaction becomes more sophisticated. Human-machine interaction protocols have been plagued by significant constraints, have been limited to lower dimensionality (e.g., in comparison to lifelike 3D), and have been rooted in mechanical instruments (e.g., keyboards and mice) that seem antiquated. While touch surfaces and trackpad devices have shown promise, hand gesture interfaces have simply not evolved. Optimizing and integrating hand gestures into 21st-century communication technology creates a significant challenge for system designers, device manufacturers, and engineering specialists alike.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 3 is a simplified schematic diagram of an enlarged view of a hand from FIG. 2;

FIG. 4 is a simplified command/action chart to be utilized in accordance with one embodiment of the present disclosure.

DETAILED DESCRIPTION OF EXAMPLE EMBODIMENTS OVERVIEW

A method is provided in one example and includes generating a histogram associated with at least one object; receiving image data; comparing the image data to the histogram in order to determine if at least a portion of the image data corresponds to the histogram; identifying a pose associated with the object; and triggering an electronic command associated with the pose. In more particular embodiments, the image data is evaluated in order to analyze sequences of poses associated with a gesture that signals the electronic command to be performed.

In specific implementations, a convexity analysis is used to determine the pose associated with the object. The object can be indicative of a hand of an individual participating in a communication session, and a geometric determination can be made about which portions of the image data reflect the hand. The geometric determination includes identifying contiguous regions of skin associated with the individual and included within the image data. In other implementations, the generating includes using a stencil that coincides with the object, and Hue-Saturation-Value (HSV) tuples of stencil regions are included within the histogram. In one example, three objects are identified within the image data, where a middle object of the three objects is eliminated and the remaining objects are evaluated with reference to the histogram.

Example Embodiments

Figure 1:
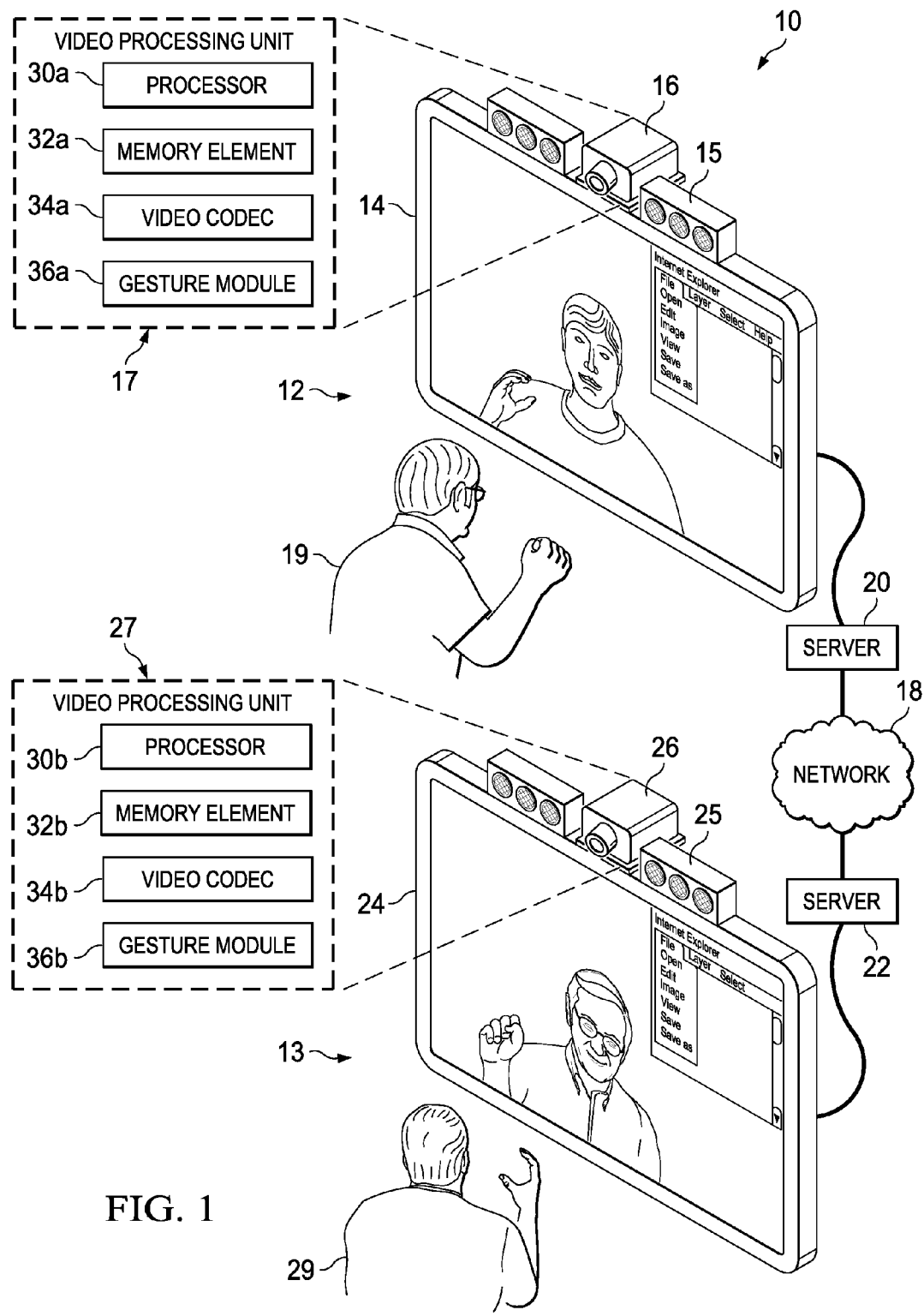
FIG. 1 is a simplified schematic diagram illustrating a system for evaluating gesture activity in a videoconferencing environment in accordance with one embodiment of the present disclosure.

Turning to FIG. 1, FIG. 1 is a simplified schematic diagram illustrating a system 10 for evaluating hand gestures to facilitate videoconferencing activities in accordance with one embodiment of the present disclosure. In a particular implementation, system 10 is representative of an architecture for conducting a videoconference over a network, where system 10 can interpret gestures made by individuals via a gesture interface control. System 10 includes two distinct communication systems that are represented as endpoints 12 and 13, which are provisioned in different geographic locations in this example. Endpoint 12 may include a display 14, a plurality of speakers 15, a camera element 16, and a video processing unit 17.

Endpoint 13 may similarly include a display 24, a plurality of speakers 25, a camera element 26, and a video processing unit 27. Additionally, each of endpoints 12 and 13 may include (or be coupled to) a respective server 20, 22, where servers 20, 22 foster communications over a network 18 between endpoints 12, 13. Each video processing unit 17, 27 may further include a respective processor 30a, 30b, a respective memory element 32a, 32b, a respective video encoder 34a, 34b, and a respective gesture module 36a, 36b. The function and operation of these elements is discussed in detail below.

In the context of a videoconference involving a participant 19 (present at endpoint 12) and a participant 29 (present at endpoint 13), either (or both) participant 19, 29 may seek to control computer functions via video processing unit 17, 27. As each participant 19 and 29 motions or moves, camera elements 16, 26 suitably capture these movements as video images to be interpreted. For example, each video processing unit 17, 27 is configured to evaluate the video images to determine if any commands have been issued by participant 19, 29. If commands have not been issued, then the video data would simply propagate along its intended path, and be delivered to the counterparty of this videoconference.

Before detailing additional capabilities of system 10, it is important understand (more generally) how gesture-based systems can optimize computer interactions. The goal of gesture recognition is to interpret human gestures via mathematical paradigms. Gestures can originate from any bodily motion or state; however, for purposes of convenience, many gestures can originate from the face or the hand. Gesture recognition can be seen as a way for computers to begin to understand human body language. Therefore, gesture recognition can be used as a framework for building a richer bridge between machines and humans. This stands in contrast to primitive text user interfaces or even graphical user interfaces, which confine the majority of the functional inputs to keyboard strikes and mouse clicks. Proper gesture recognition enables humans to interface with a machine and to interact naturally without leveraging mechanical devices. Using the concept of gesture recognition, it is possible to automatically direct computers to respond to commands. These gesture activities can make a conventional input device (e.g., a mouse or a keyboard) redundant.

Turning to the problematic issues present in many gesture and/or motion interface controls, typical hand gesture interfaces require specialized apparel (e.g., gloves, sleeves, or other transducers) to be worn by the user seeking to issue commands to an interface. More specifically, many interfaces force a participant to wear proprietary gear to enable hand pose recognition activities. Other systems may utilize a scheme for cursor movement based on the region of the video image in which a single bare hand is detected (at a range of up to a few feet). This would (theoretically) allow a participant to interact with computers in a crude manner; however, such architectures lack the robustness and intelligence to fully support intuitive, multifaceted interfaces that engender a full immersion of the user (seamlessly) into a machine environment.

In accordance with the teachings of the present disclosure, system 10 employs a gesture interface control methodology that effectively addresses the aforementioned issues. The components and protocols of system 10 can be configured to determine which commands a user is issuing by monitoring the positions of the user's hands. In particular configurations, there are three significant aspects of the protocol implemented by system 10, which collectively overcome problems that plague gesture control systems generally.

First, system 10 is configured to utilize any existing camera setup (e.g., a webcam, a laptop, a Telepresence setup, etc.) at any appropriate distance (e.g., ten feet or more) with an appropriate field of view. There is no need for specialized cameras or for high-performance video equipment to achieve the interpretation/recognition activities discussed herein. Hence, system 10 can provide an elegant solution that does not require the purchase of new audiovisual (AV) equipment.

Second, system 10 is configured to identify, track, and analyze data from one or more objects (e.g., the hand(s), the head, the face, the arms, etc.) and, further, to gather image data associated with each object. In one example embodiment, the objects tracked, identified, and analyzed by system 10 could be two bare hands and the related image data could be associated with each hand's current pose. As used herein in this Specification, the term 'pose' is meant to encompass any type of positioning, shaping, or current state of the object. Third, system 10 can utilize a robust and extendible library of electronic commands to facilitate control over all computer functionalities, over specifically designated functionalities, over proprietary functionalities, etc. This includes electronic commands within individual applications, software, hardware, soft buttons, etc. Hence, the components and protocols offer an individual a wide variety of different commands, which can maximize the user's control over the system.

Logistically, system 10 is configured to enable rich, multi-hand gesture interfaces with bare hands against arbitrary backgrounds. This can occur without the need for anything other than ambient visible light and a video camera. Moreover, an interpretation of precise hand poses offers a higher-fidelity control than other systems that bluntly attempt to interpret body positioning. System 10 is also readily tunable: allowing for a variety of settings with busy backgrounds in natural visible light. Before detailing additional operations associated with the present disclosure, some preliminary information is provided about the corresponding infrastructure of FIG. 1.

Displays 14, 24 are screens at which video data can be rendered for one or more end users. Note that as used herein in this Specification, the term 'display' is meant to connote any element that is capable of delivering image data (inclusive of video information), text, sound, audiovisual data, etc. to an end user. This would necessarily be inclusive of any panel, plasma element, television (which may be high-definition), monitor, computer interface, screen, Telepresence devices (inclusive of Telepresence boards, panels, screens, surfaces, etc.), or any other suitable element that is capable of delivering/rendering/projecting such information.

Speakers 15, 25 and camera elements 16, 26 are generally mounted around respective displays 14, 24. Camera elements 16, 26 could be wireless cameras, high-definition cameras, standard cameras, a webcam type of camera, or any other suitable camera device configured to capture image data. Similarly, any suitable audio reception mechanism can be provided to capture audio data at each location. In terms of their physical deployment, in one particular implementation, camera elements 16, 26 are digital cameras, which are mounted on the top (and at the center of) displays 14, 24. One camera can be mounted on each respective display 14, 24. Other camera arrangements and camera positioning are certainly within the broad scope of the present disclosure.

A respective participant 19, 29 may reside at each location for which a respective endpoint 12, 13 is provisioned. Endpoints 12 and 13 are representative of devices that can be used to facilitate data propagation. In one particular example, endpoints 12 and 13 represent videoconferencing endpoints, which can be used by individuals for virtually any communication purpose. It should be noted, however, that the broad term 'endpoint' can be inclusive of devices used to initiate a communication, such as any type of computer, a personal digital assistant (PDA), a laptop or electronic notebook, a cellular telephone, an iPhone, an IP phone, an iPad, a Google Droid, or any other device, component, element, or object capable of initiating or facilitating voice, audio, video, media, or data exchanges within system 10. Hence, video processing unit 17 can be readily provisioned in any such endpoint. Endpoints 12 and 13 may also be inclusive of a suitable interface to the human user, such as a microphone, a display, a keyboard or other terminal equipment. Endpoints 12 and 13 may also be any device that seeks to initiate a communication on behalf of another entity or element, such as a program, a database, or any other component, device, element, or object capable of initiating an exchange within system 10. Data, as used herein in this document, refers to any type of numeric, voice, video, media, or script data, or any type of source or object code, or any other suitable information in any appropriate format that may be communicated from one point to another.

Each endpoint 12, 13 can also be configured to include a receiving module, a transmitting module, a processor, a memory, a network interface, a call initiation and acceptance facility such as a dial pad, one or more speakers, one or more displays, etc. Any one or more of these items may be consolidated, combined, or eliminated entirely, or varied considerably, where those modifications may be made based on particular communication needs. In other embodiments, these audio and/or video features may be provided externally to these elements or included in some other proprietary device to achieve their intended functionality. Note that in one example, each endpoint 12, 13 can have internal structures (e.g., a processor, a memory element, a network interface, etc.) to facilitate the operations described herein. In still other embodiments, each endpoint 12, 13 may include any suitable algorithms, hardware, software, components, modules, interfaces, or objects that facilitate the operations thereof.

In regards to a physical infrastructure, camera element 16 can be configured to fasten to any edge (e.g., a top edge) of display 14 (e.g., a flat-screen high-definition (HD) television). Camera element 16 can be included as part of an integrated component (i.e., a single component, a proprietary element, a set-top box, etc.) that could include speakers 15 (e.g., an array microphone). Thus, all of these elements (camera element 16, speakers 15, etc.) can be combined and/or be suitably consolidated into an integrated component that rests on (or that is fixed to, or that is positioned near) display 14. Alternatively, each of these elements are separate devices that can be coupled (or simply interact with each other), and can be adequately positioned in any appropriate fashion.

Camera element 16 may interact with (or be inclusive of) devices used to initiate a communication for a video session, such as a switch, a proprietary endpoint, a microphone, a dial pad, a bridge, a telephone, a computer, or any other device, component, element, or object capable of initiating video, voice, audio, media, or data exchanges within system 10. Camera element 16 can also be configured to include a receiving module, a transmitting module, a processor, a memory, a network interface, a call initiation and acceptance facility such as a dial pad, one or more displays, etc. Any one or more of these items may be consolidated, combined, eliminated entirely, or varied considerably and those modifications may be made based on particular communication needs.

Camera element 16 can include a high-performance lens and an optical zoom, where camera element 16 is capable of performing panning and tilting operations. The video and the audio streams can be sent from camera element 16 to server 20, where they are mixed into a HDMI (High-Definition Multimedia Interface) stream. In certain implementations, camera element 16 can be provisioned as a light sensor such that the architecture can detect whether the shutter of the camera is open or closed (or whether the shutter is partially open.) An application program interface (API) can be used to control the operations of camera element 16. Likewise, camera element 26 may be configured to resemble any of the embodiments described with reference to camera element 16.

Network 18 represents a series of points or nodes of interconnected communication paths for receiving and transmitting packets of information that propagate through system 10. Network 18 offers a communicative interface between any of the nodes of FIG. 1, and may be any local area network (LAN), wireless local area network (WLAN), metropolitan area network (MAN), wide area network (WAN), virtual private network (VPN), Intranet, Extranet, or any other appropriate architecture or system that facilitates communications in a network environment. Note that in using network 18, system 10 may include a configuration capable of transmission control protocol/internet protocol (TCP/IP) communications for the transmission and/or reception of packets in a network. System 10 may also operate in conjunction with a user datagram protocol/IP (UDP/IP) or any other suitable protocol, where appropriate and based on particular needs.

Video processing units 17, 27 are video elements configured to evaluate video data and make determinations as to which (if any) commands are being issued by participants 19, 29. As used herein in this Specification, the term 'video element' is meant to encompass any suitable unit, module, software, hardware, server, program, application, application program interface (API), proxy, processor, field programmable gate array (FPGA), erasable programmable read only memory (EPROM), electrically erasable programmable ROM (EEPROM), application specific integrated circuit (ASIC), digital signal processor (DSP), or any other suitable device, component, element, or object configured to process video data. This video element may include any suitable hardware, software, components, modules, interfaces, or objects that facilitate the operations thereof. This may be inclusive of appropriate algorithms and communication protocols that allow for the effective exchange (reception and/or transmission) of data or information.

In one example implementation, video processing units 17, 27 include software (e.g., as part of gesture modules 36*a*-*b* respectively) to achieve the gesture interface control operations, as outlined herein in this document. In other embodiments, this feature may be provided externally to any of the aforementioned elements, or included in some other video element or endpoint (either of which may be proprietary) to achieve this intended functionality. Alternatively, several elements may include software (or reciprocating software) that can coordinate in order to achieve the operations, as outlined herein. In still other embodiments, any of the devices of the illustrated FIGURES may include any suitable algorithms, hardware, software, components, modules, interfaces, or objects that facilitate these skip coding management operations, as disclosed herein.

In operation, video processing unit 17 is configured to receive information from camera element 16 via some connection, which may attach to an integrated device (e.g., a set-top box, a proprietary box, etc.) that can sit atop a display. Video processing unit 17 may also be configured to control compression activities, or additional processing associated with data received from the cameras. Alternatively, a physically separate device can perform this additional processing before image data is sent to its next intended destination. Video processing unit 17 can also be configured to store, aggregate, process, export, and/or otherwise maintain image data and logs in any appropriate format, where these activities can involve processor 30*a* and memory element 32*a*. In certain example implementations, video processing unit 17 and server 20 are network elements that facilitate data flow between an endpoint and a given network. Similarly, video processing unit 27 and server 22 are network elements that facilitate a data flow in the other direction: toward its counterparty (e.g., endpoint 14). As used herein in this Specification, the term 'network element' is meant to encompass routers, switches, gateways, bridges, loadbalancers, firewalls, servers, processors, modules, or any other suitable device, component, element, or object operable to exchange information in a network environment. This includes proprietary elements equally, which can be provisioned with particular features to satisfy a unique scenario or a distinct environment.

Video processing unit 17 may interface with camera element 16 through any appropriate connection (which may be wireless), or via one or more cables or wires that allow for the propagation of signals between these two elements. These devices can also receive signals from an intermediary device, a remote control, etc., where the signals may leverage infrared, Bluetooth, WiFi, electromagnetic waves generally, or any other suitable transmission protocol for communicating data (e.g., potentially over a network) from one element to another. Virtually any control path can be leveraged in order to deliver information between video processing unit 17 and camera element 16. Transmissions between these two sets of devices can be bidirectional in certain embodiments such that the devices can interact with each other (e.g., dynamically, real-time, etc.). This would allow the devices to acknowledge transmissions from each other and offer feedback, where appropriate. Any of these devices can be consolidated with each other, or operate independently based on particular configuration needs. For example, a single box may encompass audio and video reception capabilities (e.g., a set-top box that includes the camera and microphone components for capturing video and audio data respectively).

Figure 2:
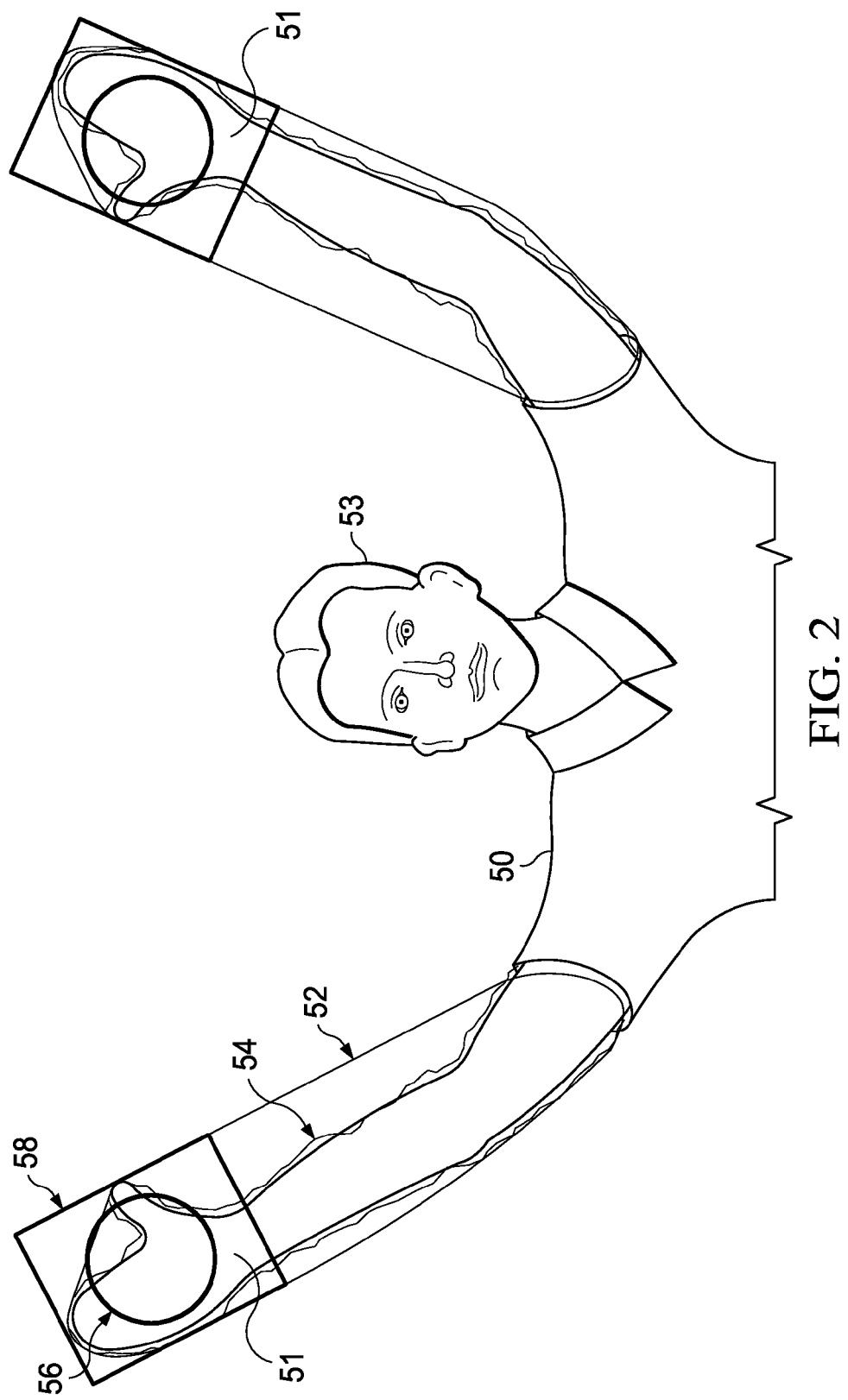
FIG. 2 is a simplified schematic diagram illustrating an image depicting specific areas to be analyzed in accordance with one embodiment of the present disclosure.

Turning to FIGS. 2-3, FIGS. 2-3 are simplified schematic diagrams illustrating representative images associated with a participant making gestures during a video session. For example, the gestures could be captured by video processing units 17, 27 during a videoconference, where that information can be captured from any suitable video input, link, or feed captured by system 10. In this particular image of FIG. 2, a user 50 is shown motioning his hands 51. Additionally, system 10 is capturing bodily motion, and any features or characteristics associated with the user's head 53. In the particular examples of FIG. 2-3, there are various data analysis regions being targeted for image data capture. Accordingly, FIGS. 2-3 include a convex hull 52, a contour 54, a pose 56, a foreshortened bounding box 58, a convexity defect 62, a polar angle 64, an axis of the forearm 66, and a horizontal axis 68.

In operational terms, the overall image of FIG. 2 can be analyzed in a series of steps to determine pose 56 (open or closed) of each hand 51. This recognition process intelligently recognizes hand poses (e.g., the positions and the shapes of the hands in the image, which can be captured at various distances (at least ten feet and beyond)). The parameters of the protocol can be tuned to optimize the precision of the recognition in any number of environments (e.g., including those in which the background contains objects with color and texture similar to the skin imagery). The protocol further includes appropriate calibration mechanisms to recognize skin (e.g., on the hand, on the face, etc.) across a diverse human population.

Referring now to FIG. 4, FIG. 4 is a simplified table 69 illustrating example hand combinations/command responses that may be programmed for use in system 10. In this particular configuration, each of the participants' hands is evaluated in order to determine whether they are attempting to issue a command. Circles are filled-in to connote when certain bodily motions are occurring (e.g., the participants' hands are closed). In response to these hand gestures being determined, the system would associate the hand gesture with a command and automatically trigger an appropriate response. For example, the system can respond by mimicking mouse commands, zooming the video, rotating/tilting camera equipment, terminating a call, opening a document, editing a document, passing the ball in a WebEx conference, sharing information using any suitable technology, etc.

In one particular example implementation, the protocol could define n^h combinations of hand poses for each video frame, where n is the number of pose types to be classified, and h is the maximum number of hands in the scene. In such an example, n=2 (open and closed), h=2 (right and left hand 51 of single user 50), and there could be four combinations of hand poses per video frame. The paradigm can assign machine actions based on a sequence of m consecutive pose combinations (video frames): allowing for n^(h*m) distinct gesture interpretations. In this example, m=2 (that is only considering the current and the immediately prior video frame), giving 2^(2*2)=16 distinct gesture interpretations. The case of n=2, h=2, m=2 is perhaps the most intuitive and enables many multi-touch gestures, such as pinch, zoom, rotate, click, drag, etc. However, the case of n^(h*m) provides an even larger set of possibilities for a nearly unlimited gesture grammar architecture, enabling more sophisticated interactions such as twisting along an arbitrary axis of rotation, hitting with variable momentum, etc. The n^(h*m) combinations can be readily translated into machine instructions.

It is imperative to note that table 69 is only representative of one possible example of the programming options for interpreting hand gestures, and triggering an appropriate response. Additionally, there could be a significantly larger volume of hand gestures provisioned within the architecture. It should similarly be noted that although the current discussions and flows have focused on specific hand signals that indicate commands, system 10 and its teachings are readily applicable to emotion recognition. In those applications, the same type of analysis discussed previously would occur, where the focus would be on the face in order to discern commands. Moreover, system 10 can easily be programmed to interpret sign language. System 10 can also be used to identify and recognize posture, gait, proxemics, and common human behaviors. For example, a user slouching during a conference could signal a command to be issued to play a sound, to play video (e.g., some type of animation), etc. In other instances, eye gaze metrics could be tracked in order to issue a command. Again, the focus in such applications would (accordingly) be on the ocular regions of a participant's face. Using the collected video information, commands can readily be executed for the particular session being conducted. Video game technology could readily adopt any of the teachings being discussed herein, where the focus of these applications may be extended to work with the torso, the legs and feet, etc. being used in the course of the video game.

Figure 5:
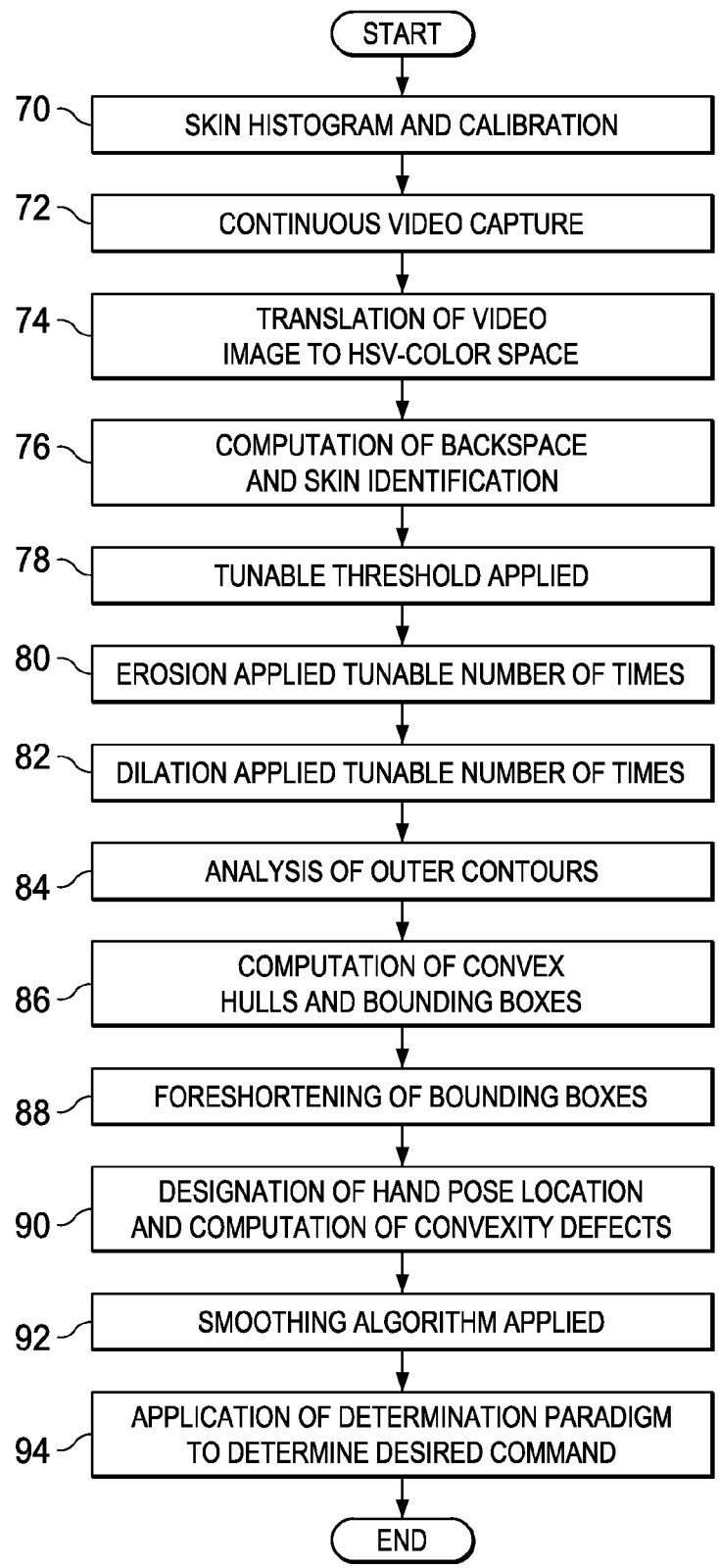
FIG. 5 is a simplified flow diagram illustrating potential operations associated with one embodiment of the present disclosure.

FIG. 5 is a simplified flowchart illustrating one example flow associated with evaluating gestures in an electronic environment. Initially, the flow can begin at operation 70, where a skin histogram is captured for each new subject. This can occur through a calibration process in the first few seconds of initial use. User 50 can be prompted by an interface, or through video processing unit 17 to position his hands 51 so that they coincide with stencils in the video frame that is monitoring the subject. Subsequently, the Hue-Saturation-Value (HSV) tuples of the stencil regions are added to the histogram. The histogram can then be used to identify the probability that each pixel of an image belongs to hand 51. After calibration has been completed, hand pose recognitions would be executed on a continuous basis for each frame of video captured. This is reflected operation 72.

In operation 74, a video frame can be translated to the HSV color space. Operation 76 computes the backspace of the video frame in the HSV space that is based on the skin histogram computed in operation 70. Furthermore, the protocol identifies the likely regions of the hand skin in the video frame, in accordance with the histogram. Then, in operation 78, a tunable threshold can be applied to filter all but the most likely hand regions in the video frame. At operation 80, erosion is applied a tunable number of times to eliminate noise (e.g., any small clusters of hand colored pixels not belonging to hands in the video frame). Dilation is applied in operation 82 (e.g., a tunable number of times) to accentuate the larger clusters of probable hand skin images in the video frame.

Subsequently, in operation 84, outer contours of the resulting clusters are computed and the largest three contours (e.g., by area of their bounding box) are retained for further analysis. In this particular example, these are most likely depicting the left and right hands 51 and face 53, as previously discussed with reference to FIG. 2. The middle of the three objects can be immediately removed, as this represents face 51. However, the protocol is intelligent enough to be applied to situations where only hands 51 are present (e.g., from the perspective of a wearable computer) by retaining only the largest two contours.

At operation 86, convex hull 52 is computed for left and right hands 51, showing the convexity of contours 54. Bounding box rectangles (not shown) of each convex hull 52 can be computed, where each bounding box takes a rectangular shape corresponding to the size of each convex hull 52. At operation 88, bounding box rectangles are foreshortened (e.g., by a tunable amount) along the axis of the forearm to focus on the hand region and, thereby, create the foreshortened bounding box 58. Note that these activities fully support gesture recognition for users wearing either long or short sleeves. Heuristics can readily be employed to determine which end of the bounding box represents hand 51. For example, in the case of hand 51 on the left of the image, if the long axis of the bounding box makes polar angle 64 between 50-degrees and 180-degrees, the upper end of the bounding box is assumed to be the hand. Additionally, if the long axis makes polar angle 64 of between 0-degrees and 50-degrees, the lower end of the bounding box can be assumed to be the hand.

The center of foreshortened bounding box 58 can be taken as the position of the hand pose at operation 90, where the convexity defects that lie within the foreshortened bounding box can be computed. The convexity defects can be analyzed to determine the type of pose. In this example, two types of poses have been implemented: open and closed. This generally provides a rich set of gestural inputs; however, the methods in this example are applicable to any number of poses that can be defined by conducting an analysis of the convexity defects. For example, if the defect were large enough (as measured by a tunable parameter) and in the correct orientation, the pose would be classified as open, otherwise the pose would be classified as closed.

Once the pose has been classified, a smoothing algorithm can be applied at operation 92 to eliminate noise from the video frames that present low-quality data (e.g., if hand 51 is moving too rapidly for camera element 16, 26 to record data sharply). Smoothing can include several steps. For example, an initial step can be associated with discarding selected objects (e.g., a hand has been detected in a position that would imply that hand 51 has moved too quickly (as measured by a tunable parameter) to represent a natural movement between frames (likely indicating a false identification)). In such a case, the associated pose would be discarded. Additionally, the pose type classification (e.g., open or closed) can be changed if a certain number of consecutive poses of the new type have been classified. For example, to change the reported pose type from open to closed, a (tunable) number of closed poses were probably detected in a row. Returning to the flow of FIG. 5, the appropriate hand pose position and the pose classification can be reported for command processing at operation 94. In general terms, the determination of an action at operation 94 can employ a paradigm for interpreting hand gestures that is simple, intuitive, and flexible to accommodate particular user needs, or specific interface scenarios.

It is imperative to note that the arrangements of FIGS. 1-5 are simply being used for discussion purposes, where various alternatives and modifications to such arrangements would be within the scope of the present disclosure. Along similar lines, the processing and memory allocations of FIGS. 1-5 may be shared by other components, consolidated, or otherwise distributed across different devices. Such modifications may be based on particular videoconferencing needs, specific environments, etc.

Note that in certain example implementations, the gesture interpretation functions outlined herein may be implemented by logic encoded in one or more tangible media (e.g., embedded logic provided in an application specific integrated circuit [ASIC], digital signal processor [DSP] instructions, software [potentially inclusive of object code and source code] to be executed by a processor, or any other similar machine, etc.). In some of these instances, a memory element [as shown in FIG. 1] can store data used for the gesture interpretation operations described herein (e.g., skin detection, pose detection, etc.). This includes the memory element being able to store software, logic, code, or processor instructions that are executed to carry out the activities described in this Specification. A processor can execute any type of instructions associated with the data to achieve the operations detailed herein in this Specification. In one example, the processor [as shown in FIG. 1] could transform an element or an article (e.g., data) from one state or thing to another state or thing. In another example, the camera enhancement activities outlined herein may be implemented with fixed logic or programmable logic (e.g., software/computer instructions executed by a processor) and the elements identified herein could be some type of a programmable processor, programmable digital logic (e.g., FPGA, an erasable programmable read only memory (EPROM), (EEPROM)), or an ASIC that includes digital logic, software, code, electronic instructions, or any suitable combination thereof.

Note that the equipment of FIG. 1 may share (or coordinate) certain processing operations. Using a similar rationale, their respective memory elements may store, maintain, and/or update data in any number of possible manners. In a general sense, the arrangements depicted in the preceding FIGURES may be more logical in their representations, whereas a physical architecture may include various permutations/combinations/hybrids of these elements. In one example implementation, camera element 16, 26 may include software (e.g., as part of, or in cooperation with, the video processing units discussed (such as image processors, EEPROMs, DSPs, FPGAs, etc.)) to achieve the gesture interpretation operations, as outlined herein in this document. In other embodiments, these features may be provided externally to any of the aforementioned elements (e.g., included in server 20), or included in some other device to achieve these functionalities. Alternatively, several elements may include software (or reciprocating software) that can coordinate in order to achieve the gesture interpretation, as outlined herein. In still other embodiments, any of the devices of the FIGURES may include any suitable algorithms, hardware, software, components, modules, interfaces, or objects that facilitate these camera enhancement operations.

All of the aforementioned devices may further keep information in any suitable memory element (e.g., random access memory (RAM), ROM, EPROM, EEPROM, ASIC, etc.), software, hardware, or in any other suitable component, device, element, or object where appropriate and based on particular needs. Any of the memory items discussed herein (e.g., database, table, key, queue, etc.) should be construed as being encompassed within the broad term 'memory element.' Similarly, any of the potential processing elements, modules, and machines described in this Specification should be construed as being encompassed within the broad term 'processor.' Camera element 16, 26 and/or server 20, 22 can also include suitable interfaces for receiving, transmitting, and/or otherwise communicating data or information in a network environment.

Note that with the examples provided herein, interaction may be described in terms of two, three, or four elements. However, this has been done for purposes of clarity and example only. In certain cases, it may be easier to describe one or more of the functionalities of a given set of flows by only referencing a limited number of elements. It should be appreciated that system 10 (and its teachings) are readily scalable and can accommodate a large number of components, as well as more complicated/sophisticated arrangements and configurations. Accordingly, the examples provided should not limit the scope or inhibit the broad teachings of system 10 as potentially applied to a myriad of other architectures.

It is also important to note that the steps in the preceding flow diagrams illustrate only some of the possible signaling scenarios and patterns that may be executed by, or within, system 10. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by system 10 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain server components, system 10 may be applicable to other protocols and arrangements (e.g., those involving any type of videoconferencing scenarios). Additionally, although camera elements 16, 26 have been described as being mounted in a particular fashion, camera elements 16, 26 could be mounted in any suitable manner in order to suitably capture video images. Other configurations could include suitable wall mountings, aisle mountings, furniture mountings, cabinet mountings, upright (standing) assemblies, etc., or arrangements in which cameras would be appropriately spaced or positioned to perform its functions.

Furthermore, the users described herein are simply individuals within the proximity, or within the field of view, of display 14. Audience members can be persons engaged in a videoconference involving other individuals at a remote site. Audience members can be associated with video game scenarios, corporate scenarios, consumer scenarios, residential scenarios, etc. or associated with any other suitable environment to which system 10 may be applicable.

Additionally, system 10 can involve different types of counterparties, where there can be asymmetry in the technologies being employed by the individuals. For example, one user may be using a laptop, while another user is using the architecture of system 10. Similarly, a smartphone could be used as one individual endpoint, while another user uses the architecture of system 10. Also, Webcams can readily be used in conjunction with system 10. Along similar lines, multi-party calls can readily be achieved using the teachings of the present disclosure. Moreover, although system 10 has been illustrated with reference to particular elements and operations that facilitate the communication process, these elements and operations may be replaced by any suitable architecture or process that achieves the intended functionality of system 10.

Additionally, although the previous discussions have focused on videoconferencing associated with particular types of endpoints, handheld devices that employ video applications could readily adopt the teachings of the present disclosure. For example, iPhones, iPads, Google Droids, personal computing applications (i.e., desktop video solutions), etc. can use the gesture interface control detailed above. Any communication system or device that processes and/or receives video data would be amenable to the gesture interfacing features discussed herein. Numerous other changes, substitutions, variations, alterations, and modifications may be ascertained to one skilled in the art and it is intended that the present disclosure encompass all such changes, substitutions, variations, alterations, and modifications as falling within the scope of the appended claims.

What is claimed is:

1. A method, comprising:
   generating a histogram of a hand associated with a user of a system, wherein the system responds to system interface electronic commands issued by the user using the hand;
   receiving image data;
   comparing the image data to the histogram using a tunable process to identify a cluster of hand colored pixels that are most likely a hand region in the image data;
   computing an outer contour of the cluster of hand colored pixels to identify a portion of the image data that reflects the hand;
   computing a convex hull for the hand reflected in the identified portion of the image data, wherein the convex hull shows a convexity of contours of the hand;
   computing a foreshortened bounding box of the convex hull that includes the hand reflected in the identified portion of the image data;
   analyzing convexity defects associated with the hand within the foreshortened bounding box to identify a pose associated with the hand reflected in the portion of the image data; and
   if the pose is associated with a system interface electronic command, triggering the system interface electronic command associated with the pose, such that the system performs a function specified by the user.

2. The method of claim 1, wherein the image data is evaluated in order to analyze sequences of poses associated with a gesture that signals the system interface electronic command to be performed.

3. The method of claim 1, wherein analyzing the convexity defects includes designating a center of the foreshortened bounding box as a position of a pose of the hand.

4. The method of claim 1, wherein computing the foreshortened bounding box includes foreshortening a bounding box along an axis of a forearm to focus on the hand reflected in the identified portion of the image data, wherein a polar angle with a long axis of the bounding box is evaluated to determine which end of the bounding box represents the hand.

5. The method of claim 1, wherein comparing the image data to the histogram using a tunable process to identify a cluster of hand colored pixels that are most likely the hand region includes:
   translating the image data to Hue-Saturation-Value (HSV) color space;
   determining backspace of the image data in HSV color space based on the captured histogram to identify likely hand regions in the image data; and
   performing a tunable filtering process, a tunable erosion process, and a tunable dilation process to identify the most likely hand region in the image data from the likely hand regions.

6. The method of claim 1, wherein generating includes prompting the user to position the hand such that a stencil coincides with the hand, and adding Hue-Saturation-Value (HSV) tuples of stencil regions to the histogram.

7. The method of claim 1, wherein analyzing the convexity defects associated with the hand within the foreshortened bounding box to identify the pose associated with the hand reflected in the portion of the image data includes comparing the convexity defects to a tunable parameter.

8. Logic encoded in one or more non-transitory tangible media that includes code for execution and when executed by a processor is operable to perform operations comprising:
generating a histogram of a hand associated with a user of a system, wherein the system responds to system interface electronic commands issued by the user using the hand;
receiving image data;
comparing the image data to the histogram using a tunable process to identify a cluster of hand colored pixels that are most likely a hand region in the image data;
computing an outer contour of the cluster of hand colored pixels to identify a portion of the image data that reflects the hand;
computing a convex hull for the hand reflected in the identified portion of the image data, wherein the convex hull shows a convexity of contours of the hand;
computing a foreshortened bounding box of the convex hull that includes the hand reflected in the identified portion of the image data;
analyzing convexity defects associated with the hand within the foreshortened bounding box to identify a pose associated with the hand reflected in the portion of the image data; and
if the pose is associated with a system interface electronic command, triggering the system interface electronic command associated with the pose, such that the system performs a function specified by the user.

9. The logic of claim 8, wherein the image data is evaluated in order to analyze sequences of poses associated with a gesture that signals the system interface electronic command to be performed.

10. The logic of claim 8, wherein analyzing the convexity defects includes designating a center of the foreshortened bounding box as a position of a pose of the hand.

11. The logic of claim 8, wherein computing the foreshortened bounding box includes foreshortening a bounding box along an axis of a forearm to focus on the hand reflected in the identified portion of the image data, wherein a polar angle with a long axis of the bounding box is evaluated to determine which end of the bounding box represents the hand.

12. The logic of claim 11, wherein comparing the image data to the histogram using a tunable process to identify a cluster of hand colored pixels that are most likely the hand region includes:
translating the image data to Hue-Saturation-Value (HSV) color space;
determining backspace of the image data in HSV color space based on the captured histogram to identify likely hand regions in the image data; and
performing a tunable filtering process, a tunable erosion process, and a tunable dilation process to identify the most likely hand region in the image data from the likely hand regions.

13. The logic of claim 8, wherein the generating includes prompting the user to position the hand such that a stencil coincides with the hand, and adding Hue-Saturation-Value (HSV) tuples of stencil regions to the histogram.

14. The logic of claim 8, analyzing the convexity defects associated with the hand within the foreshortened bounding box to identify the pose associated with the hand reflected in the portion of the image data includes comparing the convexity defects to a tunable parameter.

15. An apparatus, comprising:
a memory element configured to store data; and
a processor operable to execute instructions associated with the data, wherein the processor and the memory element cooperate such that the apparatus is configured to:
generate a histogram of a hand associated with a user of a system, wherein the system responds to system interface electronic commands issued by the user using the hand;
receive image data;
compare the image data to the histogram using a tunable process to identify a cluster of hand colored pixels that are most likely a hand region in the image data;
compute an outer contour of the cluster of hand colored pixels to identify a portion of the image data that reflects the hand;
compute a convex hull for the hand reflected in the identified portion of the image data, wherein the convex hull shows a convexity of contours of the hand;
compute a foreshortened bounding box of the convex hull that includes the hand reflected in the identified portion of the image data;
analyze convexity defects associated with the hand within the foreshortened bounding box to identify a pose associated with the hand reflected in the portion of the image data; and
if the pose is associated with a system interface electronic command, trigger the system interface electronic command associated with the pose, such that the system performs a function specified by the user.

16. The apparatus of claim 15, wherein the image data is evaluated in order to analyze sequences of poses associated with a gesture that signals the system interface electronic command to be performed.

17. The apparatus of claim 15, wherein analyzing the convexity defects includes designating a center of the foreshortened bounding box as a position of a pose of the hand.

18. The apparatus of claim 15, wherein computing the foreshortened bounding box includes foreshortening a bounding box along an axis of a forearm to focus on the hand reflected in the identified portion of the image data, wherein a polar angle with a long axis of the bounding box is evaluated to determine which end of the bounding box represents the hand.

19. The apparatus of claim 18, wherein comparing the image data to the histogram using a tunable process to identify a cluster of hand colored pixels that are most likely the hand region includes:
translating the image data to Hue-Saturation-Value (HSV) color space;
determining backspace of the image data in HSV color space based on the captured histogram to identify likely hand regions in the image data; and
performing a tunable filtering process, a tunable erosion process, and a tunable dilation process to identify the most likely hand region in the image data from the likely hand regions.

20. The apparatus of claim 15, further comprising:
a camera element configured to receive the image data, wherein the camera element is coupled to a display configured to render images during a communication session.

* * * * *